United States Patent
Barfod et al.

(10) Patent No.: US 7,488,504 B2
(45) Date of Patent: Feb. 10, 2009

(54) PROCESS FOR PRODUCTION OF A FROZEN FOOD PRODUCT

(75) Inventors: Niels Michael Barfod, Risskov (DK); Matteo Da Lio, Brabrand (DK); Finn Hjort Christensen, Odder (DK)

(73) Assignee: Danisco A/S, Copenhagen (DK)

( * ) Notice: Subject to any disclaimer, the term of this patent is extended or adjusted under 35 U.S.C. 154(b) by 679 days.

(21) Appl. No.: 11/013,424

(22) Filed: Dec. 17, 2004

(65) Prior Publication Data

US 2005/0163902 A1 Jul. 28, 2005

Related U.S. Application Data

(60) Provisional application No. 60/571,500, filed on May 17, 2004.

(51) Int. Cl.
*A21D 2/16* (2006.01)
(52) U.S. Cl. .................. 426/654; 426/100; 426/101; 426/444
(58) Field of Classification Search .............. 426/100, 426/101, 654, 444
See application file for complete search history.

(56) References Cited

U.S. PATENT DOCUMENTS

| | | | |
|---|---|---|---|
| 2,048,364 A | 7/1936 | Willems | |
| 2,587,369 A | 2/1952 | Nash | |
| 3,355,300 A | 11/1967 | Avedikian | 99/136 |
| 3,453,116 A | 7/1969 | Freund et al. | 99/90 |
| 3,479,189 A | 11/1969 | Vrang et al. | 99/118 |
| 3,510,316 A * | 5/1970 | Decker | 426/565 |
| 3,582,357 A | 6/1971 | Katz | |
| 3,647,477 A | 3/1972 | Du Ross et al. | |
| 3,673,106 A | 6/1972 | Jonas et al. | 252/356 |
| 3,677,443 A | 7/1972 | Smadar et al. | |
| 3,702,768 A | 11/1972 | Finucane et al. | 99/136 |
| 3,821,442 A | 6/1974 | Mac Donald et al. | |
| 3,924,018 A | 12/1975 | Sims et al. | |
| 3,928,648 A | 12/1975 | Stahl et al. | |
| 3,968,266 A | 7/1976 | Baugher | 426/566 |
| 3,991,224 A | 11/1976 | Strums | |
| 3,996,389 A | 12/1976 | Osborne | |
| 4,012,533 A | 3/1977 | Jonas | 426/565 |
| 4,127,679 A | 11/1978 | Amano et al. | |

(Continued)

FOREIGN PATENT DOCUMENTS

EP 0157594 10/1985

(Continued)

OTHER PUBLICATIONS

Dubey, U.K. and White, C.H. "Ice Cream Shrinkage: A Problem for the Ice Cream Industry." J. Dairy Sci. 80: 3439-3444 (1997).

(Continued)

*Primary Examiner*—Anthony Weier
(74) *Attorney, Agent, or Firm*—Steptoe & Johnson LLP

(57) ABSTRACT

The present invention provides a process for the production of a frozen food product including the step of contacting a food intermediate with an emulsifier system, wherein the emulsifier system consists essentially of compounds of formula I:

Formula I

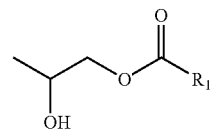

wherein $R_1$ is a hydrocarbon group; and optionally mono-diglycerides and/or unsaturated lactylated mono-diglycerides.

34 Claims, 8 Drawing Sheets

U.S. PATENT DOCUMENTS

| | | | |
|---|---|---|---|
| 4,244,977 A | 1/1981 | Kahn et al. | |
| 4,251,560 A | 2/1981 | Dell et al. | 426/565 |
| 4,421,778 A | 12/1983 | Kahn et al. | 426/564 |
| 4,431,682 A | 2/1984 | Smith et al. | 426/565 |
| 4,450,182 A | 5/1984 | Stahl et al. | |
| 4,451,492 A | 5/1984 | Dell et al. | 426/564 |
| 4,452,824 A | 6/1984 | Cole et al. | |
| 4,500,553 A | 2/1985 | Liggett et al. | |
| 4,504,510 A | 3/1985 | Aliberto et al. | |
| 4,505,943 A | 3/1985 | Dell et al. | 426/565 |
| 4,542,035 A | 9/1985 | Huang et al. | |
| 4,552,773 A | 11/1985 | Kahn et al. | 426/564 |
| 4,724,153 A | 2/1988 | Dulin et al. | |
| 4,795,650 A | 1/1989 | Groobert | |
| 4,828,866 A | 5/1989 | Wade et al. | |
| 4,853,243 A | 8/1989 | Kahn et al. | 426/564 |
| 4,988,529 A | 1/1991 | Nakaya et al. | 426/569 |
| 5,077,076 A | 12/1991 | Gonsalves et al. | 426/565 |
| 5,084,295 A | 1/1992 | Whelan et al. | 426/565 |
| 5,112,626 A | 5/1992 | Huang et al. | |
| 5,171,013 A | 12/1992 | Dooley | |
| 5,171,602 A | 12/1992 | Martin et al. | |
| 5,292,030 A | 3/1994 | Kateman et al. | |
| 5,343,710 A | 9/1994 | Cathenaut et al. | |
| 5,384,145 A | 1/1995 | Gonsalves et al. | 426/565 |
| 5,403,611 A | 4/1995 | Tomita et al. | |
| 5,472,726 A | 12/1995 | Bee et al. | |
| 5,486,372 A | 1/1996 | Martin et al. | |
| 5,486,373 A | 1/1996 | Holt et al. | |
| 5,758,571 A | 6/1998 | Kateman et al. | |
| 5,879,731 A | 3/1999 | Beckett et al. | |
| 6,083,546 A | 7/2000 | Carrick et al. | |
| 6,391,366 B1 | 5/2002 | Boldon | 426/553 |
| 6,596,333 B1 | 7/2003 | Vaghela et al. | 426/565 |
| 6,890,577 B2 | 5/2005 | Vaghela et al. | 426/565 |
| 2003/0134025 A1 | 7/2003 | Vaghela et al. | 426/565 |
| 2005/0123666 A1* | 6/2005 | Vaghela et al. | 426/565 |
| 2005/0202126 A1 | 9/2005 | Zhang et al. | 426/100 |

FOREIGN PATENT DOCUMENTS

| | | |
|---|---|---|
| EP | 0191487 | 8/1986 |
| EP | 0455288 | 11/1991 |
| EP | 1 040 760 | 5/2003 |
| EP | 1321043 | 6/2003 |
| GB | 1 173 827 | 12/1969 |
| GB | 1 446 144 | 8/1976 |
| GB | 1 484 167 | 9/1977 |
| GB | 1 495 750 | 12/1977 |
| JP | 46-421891 | 6/1967 |
| JP | 44-30580 | 12/1969 |
| JP | 59-7295 | 2/1984 |
| JP | 02-200151 | 8/1990 |
| JP | 07-303453 | 11/1995 |
| JP | 7303453 | 11/1995 |
| JP | 7303453 A | 11/1995 |
| NL | 6904019 | 9/1970 |
| WO | WO 9321777 | 11/1993 |
| WO | WO 9421138 | 9/1994 |
| WO | WO 9809536 | 3/1998 |
| WO | WO 9818350 | 5/1998 |
| WO | WO 0001246 | 1/2000 |
| WO | WO 0072697 | 12/2000 |
| WO | WO 01/06865 | 2/2001 |
| WO | WO 03015530 | 2/2003 |
| WO | WO 2005096833 | 10/2005 |
| WO | WO 2005112656 | 12/2005 |
| WO | WO 2005115164 | 12/2005 |
| WO | WO 2006099987 | 9/2006 |

OTHER PUBLICATIONS

Windhab, E.J. and Wildmoser, H., "Extrusion: A Novel Technology for the Manufacture of Ice Cream", Bulletin of the IDF 374. No date provided.

Shaw, Jei-Fue and Lo, Shian, "Production of Propylene Glycol Fatty Acid Monoesters by Lipase-Catalyzed Reactions in Organic Solvents", JAOCS, vol. 71, No. 7 (Jul. 1994).

Uses of Alpha-Crystalline Emulsifiers in the Sweet Goods, SILVA R F Cereal Foods World, vol. 45, No. 9, pp. 405-411 (2000).

Refrigeration, vol. 62, No. 718, pp. 40-52 (1987).

Refrigeration, vol. 62, No. 722, pp. 112 (1987).

Encyclopedia of Milk, 5$^{th}$ Edition, pp. 324-337 (1992).

Ice Cream Manufacturing, pp. 33-36 (1996).

Ice Cream Ingredients, pp. 58-63. No date provided.

D.W. Olson, *Journal of Dairy Science*, Abstract, 1995, 78 (Suppl. 1) 149.

Database FSTA online, International Food Information Service Kebary KMK et al., XP002291513. No date provided.

Database FSTA online, International Food Information Service, Hansen AP, XP002291514. No date provided.

Opdahl LJ et al., *Journal of Dairy Science*, vol. 74, No. 12 (1991) pp. 4151-5163.

Patent Abstracts of Japan, vol. 113, No. 17, (1987) & JP 62106840.

Database Derwent Publications Ltd., XP 002301568 & FI 93791 B (1995).

Marshall RT, Arbuckle WS, Ice Cream, Aspen Publishers Inc., 2000, pp. 58-62 (Table 5.2).

Database Online, International Food Information Service, Wielinga WC, XP002331392 (1977).

* cited by examiner

CREMODAN® SE 315 0.55%

GRINDSTED® PGMS SPV 0.30%

CREMODAN® SE 315 - after heat shock

GRINDSTED® PGMS SPV - after heat shock

PROCESS FOR PRODUCTION OF A FROZEN FOOD PRODUCT

CROSS REFERENCE TO RELATED APPLICATIONS

This application claims priority from UK Patent Application No. 0329517.7, filed on Dec. 19, 2003, and U.S. Provisional Application Ser. No. 60/571,500, filed on May 17, 2004, each of which is incorporated by reference in its entirety.

FIELD OF THE INVENTION

The present invention relates to a process for the production of a frozen food product and to use of an emulsifier system.

The present invention relates generally to methods and ingredients useful in maintaining the quality of frozen foods during frozen storage and in enhancing storage life. Frozen foods include particularly ice cream, frozen desserts, frozen dough and frozen bread.

The texture of food products as well as their flavour is important to consumers. In frozen foods, texture is to a large extent governed by the size of the ice crystals. The size of the ice crystals in the product is also important for the conservation of structure. Producers of frozen foods, such as ice creams and frozen desserts, go through considerable effort and expense to ensure smooth-textured products. However, during frozen storage the ice crystals may undergo changes in number, size and shape. These changes are known collectively as re-crystallisation. Re-crystallisation can lead to a loss of quality of frozen foods, for example by roughening or otherwise spoiling the texture of the frozen food.

Some re-crystallisation occurs naturally at constant temperatures. However temperature fluctuations are known to increase the problem of re-crystallisation. It is believed that an increase in the temperature during frozen storage causes some of the ice crystals, particularly the smaller ones, to melt and consequently leads to an increase in the amount of unfrozen water in the serum phase. As temperatures decrease, the water re-freezes but does not re-nucleate. Instead, it is deposited on the surface of larger crystals, with the net result that the total number of crystals decreases whilst the mean crystal size increases.

Temperature fluctuations which can lead to re-crystallisation are particularly common when the frozen storage conditions are less than ideal, such as during transport or during storage in home freezers. These temperature fluctuations may also occur during frozen storage as a result of the cyclic nature of refrigeration systems and the need for automatic defrost.

Although manufacturers have used a variety of techniques to reduce the damage associated with re-crystallisation, success has been limited and significant problems remain.

Traditionally, stabilisers (hydrocolloids) such as galactomanans, carrageenan, alginate, xanthan gum and sodium carboxymethylcellulose have been used to retard or reduce ice crystal growth during storage. Stabilisers, however, have no influence on the ice crystal nucleation process (the initial size of the ice crystals) and only have a limited influence on the re-crystallisation process.

Recently different solutions to enhance the storage life of ice cream and frozen desserts have been proposed. However, these new solutions also have their limitations.

Low temperature extrusion of ice cream and frozen desserts has been proposed and is now used by some ice cream and frozen desserts producers to reduce the initial size of the ice crystals in the finished ice cream and frozen dessert. However, low temperature extrusion does not prevent or slow down the re-crystallisation process. Thus, low temperature extrusion only extends the shelf life of ice cream and frozen desserts by starting the re-crystallisation process from a smaller starting point. The use of low temperature extrusion also involves high investments in new processing equipment (a single or a twin screw extruder).

The use of anti-freeze proteins (also called ice structuring proteins or ice crystal modifying proteins) has also been suggested as a means of enhancing the shelf life of ice cream and frozen products. However, it has been found that these proteins may change the texture of frozen food products, for example making them hard and brittle. A further difficulty is that production of such anti-freeze proteins on a commercial scale is currently not in place. Furthermore the necessary legal approval for use of such anti-freeze proteins has not yet been granted.

Thus there is a need for new techniques to reduce or prevent the re-crystallisation process and improve the characteristics of frozen foods such as ice cream and frozen desserts. These techniques should be inexpensive and completely safe and suitable for human consumption.

WO 01/06865 (Societe des Produits Nestle S.A.) describes a process for the production of aerated frozen products by preparing a mixture of ingredients suitable for preparing a frozen aerated product, adding an emulsifier mixture, aerating the mix and freezing the aerated mix. The emulsifier mixture comprises at least one emulsifier capable of facilitating formation and stabilisation of alpha fat crystals. According to this document, the surface areas of the alpha fat crystals serve as barriers that do not allow ice crystals within the aerated frozen products to grow into larger ice crystals. The emulsifier can be at least one of propylene glycol monostearate (PGMS), sorbitan tristearate (STS), lactylated monoglycerides (LACTEM), acetylated monoglycerides (ACETEM) or unsaturated monoglycerides. Preferably the emulsifier mixture comprises propylene glycol monostearate, sorbitan tristearate and unsaturated monoglycerides. This is the only exemplified emulsifier mixture.

The present invention alleviates the problems of the prior art.

STATEMENT OF THE INVENTION

In a first aspect the present invention provides a process for the production of a frozen food product comprising the step of contacting a food intermediate with an emulsifier system, wherein the emulsifier system consists essentially of compounds of formula I:

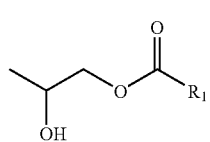

Formula I wherein $R_1$ is a hydrocarbon group; and optionally mono-diglycerides and/or unsaturated lactylated mono-diglycerides.

In a second aspect the present invention provides a frozen food product obtained or obtainable by the process as herein described.

In a third aspect the present invention provides an emulsifier system consisting essentially of compounds of formula I:

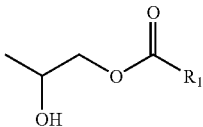

Formula I wherein $R_1$ is a hydrocarbon group; and optionally mono-diglycerides and/or unsaturated lactylated mono-diglycerides.

In a fourth aspect the present invention provides a frozen food product comprising a food intermediate and an emulsifier system; wherein the emulsifier system consists essentially of compounds of formula I:

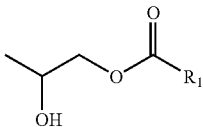

Formula I wherein $R_1$ is a hydrocarbon group; and optionally mono-diglycerides and/or unsaturated lactylated mono-diglycerides.

In a fifth aspect the present invention provides use of an emulsifier system as an ice-crystal growth inhibitor in a frozen food product, wherein the emulsifier system comprises compounds of formula I:

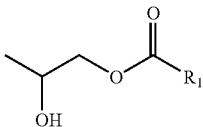

Formula I wherein $R_1$ is a hydrocarbon group.

The term "mono-diglycerides" as used herein means mono-glycerides, diglycerides and mixtures thereof.

The term "unsaturated lactylated mono-diglycerides" as used herein means lactylated mono-glycerides, diglycerides and mixtures thereof having an iodine value greater than 5.

The iodine value is defined as the number of grams of iodine absorbed by 100 grams of fat or oil (e.g. A.O.C.S. Official Method Cd 1-25). Fatty acids and derivatives having iodine values greater than 5 are understood to be at least partially unsaturated whereby partially means a mixture of saturated and (mono- or poly-)unsaturated fatty acids or derivatives.

The term "food intermediate" as used herein means a mixture of ingredients suitable for preparing a frozen food product.

The term "ice-crystal growth inhibitor" as used herein means a substance capable of reducing the ice-crystal size during initial ice crystal formation and/or capable of reducing the ice-crystal size during subsequent re-crystallisation as compared with the ice crystal sizes in the absence of the ice crystal growth inhibitor.

Advantages

It has surprisingly been found that compounds of formula I as herein described, such as propylene glycol monostearate (PGMS), provide very strong protection against ice-crystal growth in frozen food products. Contrary to what is taught in the prior art, we have surprisingly found that it is not necessary for the emulsifier system to include sorbitan tristearate (STS), lactylated monoglycerides (LACTEM), acetylated monoglycerides (ACETEM) or unsaturated monoglycerides in order for the ice crystal growth to be inhibited. The inhibition of ice-crystal formation and growth may be brought about by compounds of formula I, such as PGMS, alone.

Without wishing to be bound by theory, it is believed that the compound(s) of formula I and fat cover the formed ice crystals with a layer which is capable of physically inhibiting further ice-crystal growth. The very small ice crystals seem to be present in clusters.

The compounds of formula I give rise to uptake of water into the fat phase of the ice cream mix which can be studied by centrifugation or particle size analysis.

Furthermore, it has been found that, contrary to what is taught in the prior art, alpha fat crystals do not play any significant role in the inhibition of ice-crystal formation and growth. It is thought that the inhibition of ice crystal growth is related the ability of the water, in the lamellar phase on the surface of the fat globules in the ice cream, to bind onto the surface of the ice crystals, and in this way limit their growth.

We have also found that the air in aerated frozen products may be stabilised by a number of emulsifiers and stabilisers. For example, unsaturated monoglycerides may be replaced by saturated monoglycerides for air stabilisation.

It has also been found that saturated monoglycerides, polysorbate or unsaturated LACTEM gives an improved air bubble stability in ice cream.

Compounds of formula I can also be used to improve the texture of yoghurt through a water-binding effect.

Compounds of formula I can also be used to inhibit lactose crystallisation in ice cream and frozen desserts.

For ease of reference these and further aspects of the present invention are now discussed under appropriate section headings. However, the teachings under each section are not necessarily limited to each particular section.

Preferred Aspects

As previously mentioned, in one aspect, the present invention provides a process for the production of a frozen food product comprising the step of contacting a food intermediate with an emulsifier system, wherein the emulsifier system consists essentially of compounds of formula I:

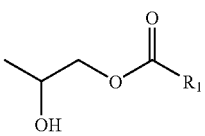

Formula I wherein $R_1$ is a hydrocarbon group; and optionally mono-diglycerides and/or unsaturated lactylated mono-diglycerides.

Emulsifier System

Compounds of Formula I

In a preferred aspect, $R_1$ in Formula I is a $C_1$-$C_{30}$ hydrocarbon group.

Here the term "hydrocarbon" means any one of an alkyl group, an alkenyl group, or an alkynyl group, which groups may be linear, branched or cyclic, or an aryl group. The term hydrocarbon also includes those groups but wherein they have been optionally substituted. If the hydrocarbon is a branched structure having substituent(s) thereon, then the substitution may be on either the hydrocarbon backbone or on the branch; alternatively the substitutions may be on the hydrocarbon backbone and on the branch.

Preferably $R_1$ in Formula I is independently selected from a $C_7$-$C_{29}$ hydrocarbon group. More preferably $R_1$ is independently selected from a $C_{11}$-$C_{29}$ hydrocarbon group, more preferably $R_1$ is independently selected from a $C_{17}$-$C_{29}$ hydrocarbon group, such as a $C_{17}$-$C_{23}$ group or a $C_{19}$-$C_{23}$ group. In a highly preferred aspect $R_1$ is a $C_{21}$ hydrocarbon group. In further preferred aspects $R_1$ is independently selected from a $C_9$-$C_{27}$ hydrocarbon group, more preferably $R_1$ is independently selected from a $C_{15}$-$C_{27}$ hydrocarbon group, such as a $C_{15}$-$C_{21}$ group or a $C_{17}$-$C_{21}$ group. In a highly preferred aspect $R_1$ is a $C_{15}$ hydrocarbon group. In a particularly highly preferred aspect $R_1$ is a $C_{17}$ hydrocarbon group.

Preferably $R_1$ in Formula I is independently selected from a $C_7$-$C_{29}$ alkyl group. More preferably $R_1$ is independently selected from a $C_{11}$-$C_{29}$ alkyl group, more preferably $R_1$ is independently selected from a $C_{17}$-$C_{29}$ alkyl group, such as a $C_{17}$-$C_{23}$ group or a $C_{19}$-$C_{23}$ group. In a highly preferred aspect $R_1$ is independently selected from a $C_{21}$ alkyl group. In further preferred aspects $R_1$ is independently selected from a $C_9$-$C_{27}$ alkyl group, more preferably $R_1$ is independently selected from a $C_{15}$-$C_{27}$ alkyl group, such as a $C_{15}$-$C_{21}$ group or a $C_{17}$-$C_{21}$ group. In a particularly highly preferred aspect $R_1$ is a $C_{15}$ alkyl group. In a particularly highly preferred aspect $R_1$ is a $C_{17}$ alkyl group.

Preferably $R_1$ is a saturated hydrocarbon group.

In one aspect $R_1$ is independently selected from saturated hydrocarbon groups and a unsaturated hydrocarbon groups. Thus in this aspect the present invention may provide a process for the production of a frozen food product comprising the step of contacting a food intermediate with an emulsifier system, wherein the emulsifier system consists essentially of compounds of formula I:

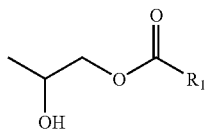

Formula I wherein $R_1$ is a hydrocarbon group; and optionally saturated mono-diglycerides and/or unsaturated mono-diglycerides.

Preferably $R_1$ is a $(CH_2)_n CH_3$ group, wherein n is zero or a positive integer. Preferably n is independently selected from an integer from 6 to 28, more preferably 10 to 28, more preferably 16 to 28, such as 16 to 22, or 18 to 22. In a highly preferred aspect n is 20. Preferably n is independently selected from an integer from 6 to 28, more preferably 8 to 26, more preferably 14 to 26, such as 14 to 20, or 16 to 20. In a particularly highly preferred aspect n is 14. In a particularly highly preferred aspect n is 16.

It will be appreciated that the present invention provides for mixtures of compounds of formula I as described herein. For example the present invention envisages mixtures of compounds or Formula I wherein in one compound $R_1$ is a $C_{15}$ alkyl group and in another compound $R_1$ is a $C_{17}$ alkyl group.

For example the present invention envisages mixtures of compounds or Formula I wherein in one compound $R_1$ is a $(CH_2)_{14}CH_3$ group and in another compound $R_1$ is a $(CH_2)_{16}CH_3$ group.

In one highly preferred aspect the compound of formula I is or is at least propylene glycol monostearate (PGMS).

The emulsifier system may comprise minor amounts of compounds of formula II.

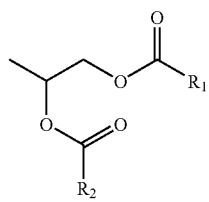

Formula II wherein $R_1$ is a hydrocarbon group and $R_2$ is a hydrocarbon group.

Preparation of Compounds of Formula I

Industrial production of propylene glycol fatty acid esters according to formula I can take place via the esterification of propylene glycol with fatty acids, typically in the form of commercial stearic acid blends. The esterification is performed at temperatures of 170-210° C. with or without the presence of an alkaline catalyst. During the reaction, water is separated from the reaction mixture by distillation. It is possible to control the composition of the reaction mixture by changing the ratio between fatty acid and propylene glycol.

After concentration of the reaction mixture by distillation of excess propylene glycol the typical product consist of a mixture of about 50-70% monoesters according to formula I and 30-50% diesters according to formula II. Concentration of the monoester can be achieved by fractional crystallisation from hexane or via a molecular distillation process, which is typically for the industrial production process. The final product then has a propylene glycol monoester content according to formula I, preferable from about 90-100% more preferable from about 95-100% propylene glycol monoesters according to formula I.

Propylene glycol esters can be made by a different method based on interesterification of fats (triglycerides) with propylene glycol in the presence of an alkaline catalyst. The reaction takes place at temperatures between 200° C. and 300° C. and pressures of up to 15 bar. The reaction mixture is quite complex, containing propylene glycol mono and diesters together with monoglycerides, diglycerides and triglycerides and some free propylene glycol fatty acids and glycerol The concentration of monoesters can be achieved by molecular distillation, depending on the application, the reaction mixture from the interesterification may be used directly after optional removal of free propylene glycol and free glycerol.

Enzymatic catalysed esterification of propylene glycol with fatty acids has been described, but this technology is not yet used on a commercial scale (Shaw, Jei-Fu; Lo-Shian, *J. Amer. Oil Chem. Soc.,* 1994, 71, 715).

Optional Mono-Diglycerides and/or Unsaturated Lactylated Mono-Diglycerides

As previously mentioned, in one aspect, the present invention provides a process for the production of a frozen food product comprising the step of contacting a food intermediate with an emulsifier system, wherein the emulsifier system consists essentially of compounds of formula I:

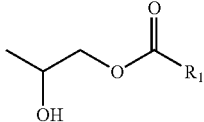

Formula I wherein $R_1$ is a hydrocarbon group; and optionally mono-diglycerides and/or unsaturated lactylated mono-diglycerides.

In one preferred aspect, the present invention provides a process for the production of a frozen food product comprising the step of contacting a food intermediate with an emulsifier system, wherein the emulsifier system consists essentially of compounds of formula I:

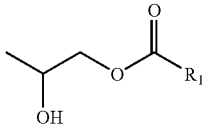

Formula I wherein $R_1$ is a hydrocarbon group; and optionally mono-diglycerides.

In one preferred aspect the emulsifier system consists essentially of compounds of formula I.

In another preferred aspect the emulsifier system consists essentially of compounds of formula I and mono-diglycerides.

In a further preferred aspect the emulsifier system consists essentially of compounds of formula I and unsaturated lactylated mono-diglycerides.

In a further preferred aspect the emulsifier system consists essentially of compounds of formula I, mono-diglycerides and unsaturated lactylated mono-diglycerides.

In one preferred aspect the optional mono-diglycerides are present. In one preferred aspect the optional unsaturated lactylated mono-diglycerides are present. In one preferred aspect the optional mono-diglycerides and the optional unsaturated lactylated mono-diglycerides are present.

In one preferred aspect the optional mono-diglycerides are monoglycerides. In one preferred aspect the optional mono-diglycerides are diglycerides. In one preferred aspect the optional mono-diglycerides are a mixture of monoglycerides and diglycerides.

It has been found that the compounds of formula I and the mono-diglycerides and/or unsaturated lactylated mono-diglycerides have a synergistic effect.

Preferably the mono-diglycerides are saturated mono-diglycerides.

In one aspect the mono-diglycerides are present in the composition/process of the present invention.

Thus in one preferred aspect, the present invention provides a process for the production of a frozen food product comprising the step of contacting a food intermediate with an emulsifier system, wherein the emulsifier system consists essentially of compounds of formula I:

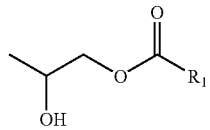

Formula I wherein $R_1$ is a hydrocarbon group; and saturated mono-diglycerides (such as saturated monoglycerides).

Preferably the mono-diglycerides for use in the present invention are selected from mono-diglycerides having any suitable fatty acid chain length. For example mono-diglycerides having a fatty acid chain length of from 4 to 24 carbons such as 4 to 24 carbons, 6 to 24 carbons, 8 to 24 carbons, 10 to 24 carbons, 12 to 24 carbons, 4 to 22 carbons, 4 to 20 carbons, 4 to 18 carbons, 4 to 16 carbons, 4 to 14 carbons, 4 to 12 carbons, 6 to 22 carbons, 8 to 20 carbons, 10 to 18 carbons, 10 to 16 carbons, 10 to 14 carbons, mono-diglycerides having a fatty acid chain length of 12 carbons including the reaction product of glycerol and lauric acid (preferably the lauric acid is obtained from coconut oil, palm kernel oil including Babassu oil, Cohune oil, Murumuru oil, Ouricuri oil and Tucum oil), and mono-diglycerides prepared from the reaction product of glycerol and animal fats, including lard and tallow, or from the reaction product of glycerol and vegetable oils including rape seed oil, soya bean oil, palm oil; mixtures and derivatives thereof.

An example of a suitable mono-diglyceride is DIMODAN® HR (distilled, saturated mono-diglycerides) available from Danisco A/S.

It has been found that the presence in the emulsifier system of mono-diglycerides, preferably saturated mono-diglycerides, and/or unsaturated lactylated mono-diglycerides enhances the effect of the compounds of formula I by increasing the melting stability of the frozen food product. In particular, it has been found that when the frozen food product is ice cream the presence of mono-diglycerides and/or unsaturated lactylated mono-diglycerides leads to an increase in the creaminess and melting stability of the ice cream.

Emulsifier System

In a preferred embodiment the emulsifier system comprises no sorbitan tristearate (or is essentially free of sorbitan tristearate).

In a further preferred embodiment the emulsifier system comprises no acetylated monoglycerides (or is essentially free of acetylated monoglycerides).

It has been found that the presence in the emulsifier system of emulsifiers other than compounds of formula I, mono-diglycerides and unsaturated lactylated mono-diglycerides may have a detrimental effect on the ice crystal size after the heat shock test. In particular, it has been found that the presence in the emulsifier system of emulsifiers such as sorbitan tristearate and acetylated monoglycerides has a detrimental effect on the ice crystal size after the heat shock test.

Quantities

As previously mentioned, in one aspect, the present invention provides a process for the production of a frozen food product comprising the step of contacting a food intermediate with an emulsifier system, wherein the emulsifier system consists essentially of compounds of formula I:

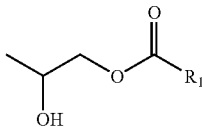

Formula I wherein $R_1$ is a hydrocarbon group; and optionally mono-diglycerides and/or unsaturated lactylated mono-diglycerides.

Preferably the compounds of formula I are present in an amount of at least 0.2% by weight of the food intermediate, more preferably 0.2% to 1.00%, more preferably 0.2% to 0.5%, such as about 0.3% or about 0.45%.

Preferably the mono-diglycerides are present in an amount of 0.05% to 1.0% by weight of the food intermediate, more preferably 0.05% to 0.8%, 0.05% to 0.6%, more preferably around 0.1 to 0.6% by weight of the food intermediate.

Preferably the compounds of formula I and the mono-diglycerides are present in a ratio of around 2:1 to 1:2.

Preferably the compounds of formula I are present in an amount of about 0.3% by weight of the food intermediate and the mono-diglycerides are present in an amount of about 0.15% by weight of the food intermediate.

It has been found that contacting a food intermediate with an emulsifier system which contains compounds of formula I in an amount of about 0.3% by weight of the food intermediate and mono-diglycerides, preferably saturated mono-diglycerides in an amount of about 0.15% by weight of the food intermediate produces a frozen food product with ice crystals about 60% smaller than those in a frozen food product made with a prior art emulsifier/stabiliser system such as CREMODAN® SE 716 from Danisco A/S, when severe heat shock occurs.

Furthermore, it has been found that contacting a food intermediate with an emulsifier system which contains compounds of formula I and mono-diglycerides and/or unsaturated lactylated mono-diglycerides produces a frozen food product with ice crystals about 40% smaller than those in a frozen food product made with an emulsifier system which contains only compounds of formula I. Thus it has been found that the compounds of formula I and the mono-diglycerides and/or unsaturated lactylated mono-diglycerides have a synergistic effect on ice-crystal growth inhibition.

It is believed that the compounds of formula I are able to inhibit the growth of ice crystals whilst the mono-diglycerides and/or unsaturated lactylated mono-diglycerides stabilise air bubbles, increase the melting stability and improve the sensory properties of the frozen food product. Thus an emulsifier system consisting essentially of compounds of formula I and mono-diglycerides and/or unsaturated lactylated mono-diglycerides, preferably saturated mono-diglycerides is highly advantageous.

Food Intermediate

As previously mentioned, in one aspect, the present invention provides a process for the production of a frozen food product comprising the step of contacting a food intermediate with an emulsifier system, wherein the emulsifier system consists essentially of compounds of formula I:

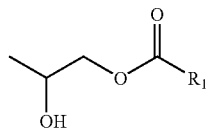

Formula I wherein $R_1$ is a hydrocarbon group; and optionally mono-diglycerides and/or unsaturated lactylated mono-diglycerides.

As previously defined, the term "food intermediate" as used herein means a mixture of ingredients suitable for preparing a frozen food product.

The ingredients will depend on the desired frozen food product. For example, if the desired frozen food product is ice-cream, suitable ingredients may include water, fat such as milkfat or vegetable fat, milk solids not fat (MSNF), sweeteners, stabilisers, flavourings and colourings. By way of further example, if the frozen food product is dough, suitable ingredients may include water, fat such as vegetable fat, flour, yeast, salt, enzymes and stabilisers.

In one preferred embodiment the food intermediate comprises fat. Preferably the fat is a high lauric fat or milkfat.

The term "high lauric fat" as used herein means a fat in which the predominant fatty acid is lauric acid.

In a preferred embodiment the fat is a high lauric fat selected from the group consisting of hardened palm kernel oil and hardened coconut oil.

It has been found that the smallest ice crystals are obtained when the fat is β' stable. High lauric fats such as hardened palm kernel oil and hardened coconut oil are β' stable. Thus, in one preferred embodiment, the food intermediate comprises a β' stable fat. Benefat® D from Danisco which is an alpha-stable fat gives inferior effect. This indicates that alpha fat crystals are not responsible for the ice crystal effect.

Without wishing to be bound by theory, it is believed that the compounds of formula I and the fat cover the formed ice crystals with a layer which may physically inhibit further ice crystal growth, see FIG. 8. The very small ice crystals seems to be present in clusters, see FIGS. 3 and 5.

Ice Cream Manufacture

As previously mentioned, the process of the present invention comprises the step of contacting a food intermediate with an emulsifier system.

It will be readily appreciated that the additional process steps will depend on the desired frozen food product. When the desired frozen food product is ice cream, the following process steps may be carried out.

Blending

Firstly the selected ingredients are mixed together. Typically the liquid ingredients are mixed together first and the dry ingredients are added subsequently. The liquid ingredients may be cold or may be heated to approximately 60° C. Blending requires rapid agitation to incorporate powders and often high speed blenders are used.

If butter/butter oil or vegetable fat is used, it should ideally be melted separately and added to the mix at 40° C. or via a static mixer at the entrance of the homogeniser by means of a dosing pump.

Pasteurising and Homogenising

The mix is subsequently pasteurised. Pasteurisation is carried out to destroy pathogenic bacteria and spoilage organisms such as psychrotrophs. There are three distinct stages in pasteurization: pasteurization, homogenisation and cooling Homogenisation of the mix is carried out in order to form the fat emulsion by breaking down or reducing the size of the fat globules found to less than 1 μm.

Pasteurisation may be carried out by continuous pasteurisation or batch pasteurisation.

Continuous Pasteurisation

Today the most common pasteurisation principle applied is continuous pasteurisation where the ice cream mix is typically heated for a minimum of 16 seconds at a temperature ranging from 80-90° C. in a plate heat exchanger. Continuous pasteurisation is usually performed in a high temperature short time (HTST) heat exchanger following blending of ingredients in a large, insulated feed tank. Some preheating, to 30° C. to 40° C., is necessary for solubilisation of the components. The HTST system is equipped with heating sections, cooling sections, and regenerative sections.

Batch Pasteurisation

Batch pasteurisation is the old method where all mix ingredients are slowly heated in a vat equipped with a hot water jacket. In order to avoid fouling on the bottom and sides of the vat, the heating process has to be gentle with a low differential temperature (delta T) between the mix and the heating medium. As the delta T has to be low and the ratio of mix volume/vat surface is typically high, it will inevitably take several minutes just to heat the mix to a temperature of 60° C. Effective agitation of the mix is needed in order to improve the transfer of heat from the vat surface to the mix. Energy consumption for batch pasteurisation is very high and, unlike continuous pasteurisation, there is no heat recovery.

Homogenisation

Following pasteurisation, the mix is homogenised by means of high pressures. Homogenisation typically takes place at a temperature of about 80° C. and the homogenisation pressure can be in the region of 90 bar (1300 psi) to 250 bar (3600 psi) at a temperature of 65-75° C. Batch tanks are usually operated in tandem so that one is holding while the other is being prepared. Automatic timers and valves ensure the proper holding time has been met.

Homogenisation can be carried out either before or after pasteurisation.

Subsequently the mix is cooled to refrigerated temperatures (4° C.) by passing it across a heat exchanger (plate or double or triple tube).

Aging

The mixture is cooled to the aging temperature which is about 4° C. The mix is then aged for a minimum of four hours but preferably overnight. This allows time for the fat to crystallize and for the proteins and polysaccharides to fully hydrate.

Freezing

Following aging, the mix may be drawn into a flavour tank where any liquid flavours, fruit purees, or colours are added. The mix then enters the dynamic freezing process which both freezes a portion of the water and whips air into the frozen mix. Freezing may be carried out by a continuous freezing process or by batch freezing/whipping.

Continuous freezing may be carried out in a barrel freezer. The barrel freezer is a scraped-surface, tubular heat exchanger, which is jacketed with a boiling refrigerant such as ammonia or freon. The mix is pumped through the barrel freezer and is drawn off the other end in about 30 seconds to 3 minutes. In the case of batch freezers the process takes 10 to 15 minutes. When the mix is drawn off the other end about 50% of its water is frozen. There are rotating blades inside the barrel freezer that keep the ice scraped off the surface of the freezer. There are also dashers inside the machine which help to whip the mix and incorporate air.

Ice cream contains a considerable quantity of air, typically up to half of its volume. This gives the product its characteristic lightness. The air content is termed its overrun.

Hardening

As the ice cream is drawn with about half of its water frozen, particulate matter such as fruit pieces, nuts or cookies, may be added to the semi-frozen slurry. The ice cream is then packaged and is placed into a blast freezer at −30° to −40° C. where most of the remainder of the water is frozen.

Hardening involves static (still, quiescent) freezing of the packaged products in blast freezers. The freezing rate should ideally be rapid, so freezing techniques involve low temperature (−40° C.) with either enhanced convection (freezing tunnels with forced air fans) or enhanced conduction (plate freezers).

Instead of a traditional hardening process the ice cream may be pumped from the ice cream freezer into a low temperature extruder (single or double screw extruder) which brings the temperature of the ice cream down to −12° C. to −18° C. After filling or extrusion the ice cream may be taken directly into cold storage.

Storage

The hardened ice cream should be stored below −25° C. Below about −25° C., ice cream is quite stable for long time without danger of fast ice crystal growth; however, above this temperature, ice crystal growth is possible and the rate of crystal growth is dependent upon the temperature of storage. The higher the storage temperature, the faster the growth rate of the ice crystals. This limits the shelf life of the ice cream.

Process Steps

As previously mentioned, the process of the present invention comprises the step of contacting a food intermediate with an emulsifier system.

In one preferred embodiment, the process comprises the step of dissolving the emulsifier system in water. In this embodiment the emulsifier system may be dissolved in water and the food intermediate may then be contacted with water.

In one preferred embodiment, the process comprises the step of dissolving the emulsifier system in fat. In this embodiment the emulsifier system may be dissolved in fat and the food intermediate may then be contacted with fat.

In one preferred embodiment the process comprises a dynamic freezing step.

The term "dynamic freezing step" as defined herein means subjecting the food intermediate to freezing conditions whilst agitating the food intermediate. This is in contrast to a quiescent freezing step in which the food intermediate is subjected to freezing conditions whilst static.

It has been found that the compounds of formula I do not significantly influence ice crystal growth under quiescent freezing conditions (without mechanical treatment as studied by cold stage microscopy).

In one preferred embodiment the process comprises a freezing step.

In one preferred embodiment the process comprises a freezing step with a drawing temperature from the freezer lower than −4° C. Preferably the drawing temperature from the freezer is about −4° C. to −7° C., preferably about −5° C. to −7° C., more preferably about −5° C. to −6° C., more preferably about −6° C.

The drawing temperature is the temperature of the ice cream as it exits the ice cream freezer.

In one embodiment, the present invention provides a process for the production of a frozen food product comprising the steps of:
(i) blending a food intermediate;
(ii) contacting the food intermediate with an emulsifier system;
(iii) pasteurising the food intermediate;
(iv) homogenising the food intermediate;
(v) aging the food intermediate;
(vi) freezing the food intermediate; and
(vii) hardening the food intermediate;
wherein the emulsifier system consists essentially of compounds of formula I:

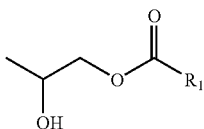

Formula I wherein $R_1$ is a hydrocarbon group; and optionally mono-diglycerides and/or unsaturated lactylated mono-diglycerides.

Frozen Food Product

In one preferred embodiment the frozen food product is an aerated frozen food product.

In this embodiment, the present invention provides a process for the production of an aerated frozen food product comprising the step of contacting a food intermediate with an emulsifier system, wherein the emulsifier system consists essentially of compounds of formula I:

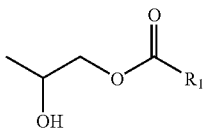

Formula I wherein $R_1$ is a hydrocarbon group; and optionally mono-diglycerides and/or unsaturated lactylated mono-diglycerides.

The term "aerated frozen food product" as used herein means a frozen food product into which air has been incorporated during production.

As previously mentioned, in one aspect the present invention provides a frozen food product obtained or obtainable by the process as herein described.

In one preferred aspect the present invention provides a frozen food product which is resistant to heat shock.

The term "resistant to heat shock" as used herein means capable of undergoing temperature recycling of about −5° C. to about −20° C. every 6 hours for a period of about one week without substantial structural change.

We have surprisingly found that during heat shock the ice crystals in a frozen food product produced using an emulsifier system according to the present invention grow about 50 to 500% less than ice crystals in a frozen food product produced using prior art mono-diglyceride emulsifiers. Growth is measured as the difference in D(50,3) between heat shock treated and fresh ice cream.

D(50,3) is defined as the mean particle (ice crystal) size diameter, which is used to compare different particle (ice crystal) size distributions. This size in µm is called D(50,0) (number distribution) or D(50,3) (volume distribution). With reference to this size (diameter), 50% of the total number or volume of the dispersed particles (ice crystals) have smaller diameters and 50% of the total number or volume of particles have larger diameters.

In one preferred aspect the present invention provides a frozen food product which contains round ice crystals, preferably round ice crystals with sizes (D(50,3)) of less than 30 µm, preferably less then 28 µm, more preferably less than 24 µm.

It has been found that a frozen food product produced in accordance with the present invention contains very small round ice crystals which are typically 30% smaller (the difference in D(50,3)) than ice crystals in a fresh (non-heat shock treated) frozen food product produced using prior art mono-diglyceride emulsifiers.

Preferably the frozen food product is selected from the group consisting of ice cream, ice milk, frozen yoghurt, frozen desserts, frozen fruit juice, sherbet, frozen water ice (such as ice flakes for chilling fish or ice crystals used in refrigerating systems), frozen dough, bread during frozen storage and frozen vegetables.

In one embodiment, preferably the frozen food product is selected from the group consisting of ice cream, ice milk, frozen yoghurt and frozen desserts. More preferably the frozen food product is ice cream.

In one embodiment, preferably the frozen food product is selected from the group consisting of frozen fruit juice, sherbet and frozen water ice (such as ice flakes for chilling fish or ice crystals used in refrigerating systems). More preferably the frozen food product is frozen water ice.

In one embodiment, preferably the frozen food product is selected from the group consisting of frozen dough and bread during frozen storage.

In one embodiment, preferably the frozen food product is frozen vegetables.

Emulsifier System

In one aspect the present invention provides an emulsifier system consisting essentially of compounds of formula I:

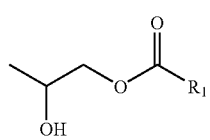

Formula I wherein $R_1$ is a hydrocarbon group; and optionally mono-diglycerides and/or unsaturated lactylated mono-diglycerides.

Preferably the present invention provides an emulsifier system as herein defined.

In one aspect the present invention provides a frozen food product comprising a food intermediate and an emulsifier system; wherein the emulsifier system consists essentially of compounds of formula I:

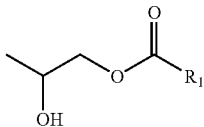
Formula I wherein $R_1$ is a hydrocarbon group and optionally mono-diglycerides and/or unsaturated lactylated mono-diglycerides.

Use

In a broad aspect the present invention provides use of an emulsifier system for inhibiting ice-crystal growth, wherein the emulsifier system comprises compounds of formula I:

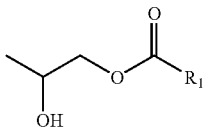
Formula I wherein $R_1$ is a hydrocarbon group.

As previously mentioned, in one aspect the present invention provides use of an emulsifier system for inhibiting ice-crystal growth in a frozen food product, wherein the emulsifier system comprises compounds of formula I:

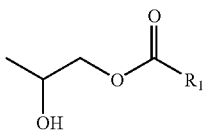
Formula I wherein $R_1$ is a hydrocarbon group.

Preferably the present invention provides use of an emulsifier system for inhibiting ice-crystal growth in a frozen food product wherein the emulsifier system consists essentially of compounds of formula I:

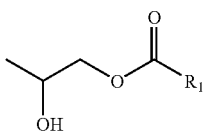
Formula I wherein $R_1$ is a hydrocarbon group; and optionally mono-diglycerides and/or unsaturated lactylated mono-diglycerides.

More preferably the present invention provides use of an emulsifier system for inhibiting ice-crystal growth inhibitor in a frozen food product wherein the emulsifier system is as herein defined.

In a further aspect the present invention provides use of an emulsifier system for increasing water absorption into the fat phase of a frozen food product; wherein the emulsifier system comprises compounds of formula I:

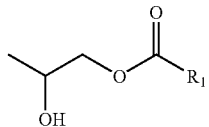
Formula I wherein $R_1$ is a hydrocarbon group.

Preferably the frozen food product is produced from a food intermediate. Preferably the food intermediate comprises water and fat.

Preferably, in this aspect, the emulsifier system consists essentially of compounds of formula I:

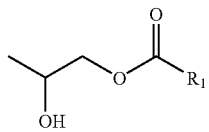
Formula I wherein $R_1$ is a hydrocarbon group; and optionally mono-diglycerides and/or unsaturated lactylated mono-diglycerides.

More preferably the present invention provides use of an emulsifier system to increase water absorption into the fat phase of a frozen food product wherein the emulsifier system is as herein defined.

Broad Aspects

In a broad aspect, the present invention provides a process for the production of a frozen food product comprising the step of contacting a food intermediate with an emulsifier system, wherein the emulsifier system is capable of both inhibiting ice crystal growth and stabilising the air cell structure.

In a further broad aspect, the present invention provides a process for the production of a frozen food product comprising the step of contacting a food intermediate with an emulsifier system, wherein the food intermediate comprises fat and wherein the emulsifier system is capable of stabilising a β' structure of the fat phase and forming a lamellar structure on the surface of the fat globules.

In this aspect preferably the emulsifier system consists essentially of compounds of formula I:

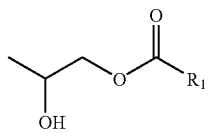
Formula I wherein $R_1$ is a hydrocarbon group; and optionally mono-diglycerides and/or unsaturated lactylated mono-diglycerides.

In a broad aspect the present invention provides a process for the production of a frozen food product comprising the step of contacting a food intermediate with an emulsifier system, wherein the emulsifier system comprises compounds of formula I:

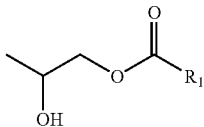

Formula I wherein $R_1$ is a saturated $C_7$-$C_{29}$, preferably $C_{21}$, preferably $C_{17}$, hydrocarbon group.

In a broad aspect the present invention provides a process for the production of a frozen food product comprising the step of contacting a food intermediate with an emulsifier system, wherein the emulsifier system comprises compounds of formula I:

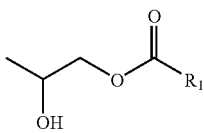

Formula I wherein $R_1$ is a hydrocarbon group, and wherein the compounds of formula I are present in an amount of between 0.2 and 1.0%, preferably about 0.30 to 0.45% by weight of the food intermediate.

In a broad aspect the present invention provides a process for the production of a frozen food product comprising the step of contacting a food intermediate with an emulsifier system, wherein the emulsifier system comprises compounds of formula I:

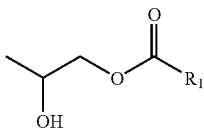

Formula I wherein $R_1$ is a hydrocarbon group and wherein the process comprises a freezing step and wherein the drawing temperature is about $-4°$ C. to $-7°$ C., preferably about $-6°$ C.

In a broad aspect the present invention provides a process for the production of a frozen food product comprising the step of contacting a food intermediate with an emulsifier system, wherein the emulsifier system comprises compounds of formula I:

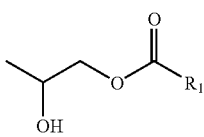

Formula I wherein $R_1$ is a hydrocarbon group and wherein the process comprises a dynamic freezing step.

In a broad aspect the present invention provides a process for the production of an aerated frozen food product comprising the step of contacting a food intermediate with an emulsifier system, wherein the emulsifier system comprises compounds of formula I:

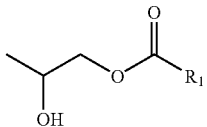

Formula I wherein $R_1$ is a hydrocarbon group and wherein the overrun is less than 200%

In a broad aspect the present invention provides a process for the production of a frozen food product comprising the step of contacting a food intermediate with an emulsifier system, wherein the emulsifier system comprises compounds of formula I:

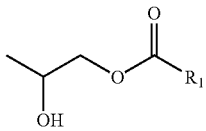

Formula I wherein $R_1$ is a hydrocarbon group; and wherein the compounds of formula I are dissolved in water prior to being contacted with the food intermediate.

In a broad aspect the present invention provides a process for the production of a frozen food product comprising the step of contacting a food intermediate with an emulsifier system, wherein the emulsifier system comprises compounds of formula I:

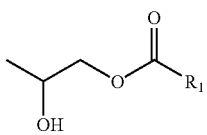

Formula I wherein $R_1$ is a hydrocarbon group; and wherein the compounds of formula I are dissolved in fat prior to being contacted with the food intermediate.

In a broad aspect the present invention provides a process for the production of a frozen food product comprising the step of contacting a food intermediate with an emulsifier system, wherein the emulsifier system comprises compounds of formula I:

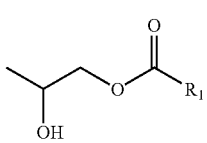

Formula I wherein $R_1$ is a hydrocarbon group and wherein the food intermediate comprises fat, preferably a high lauric fat, more preferably a high lauric fat selected from hardened palm kernel oil and hardened coconut oil.

In a broad aspect the present invention provides a process for the production of a frozen food product comprising the step of contacting a food intermediate with an emulsifier system, wherein the emulsifier system comprises compounds of formula I:

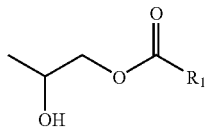

Formula I wherein $R_1$ is a hydrocarbon group and mono-diglycerides and/or unsaturated lactylated mono-diglycerides and wherein the compounds of formula I are present in an amount of 0.2% to 0.5%, preferably about 0.3% to 0.45% by weight of the food intermediate and the mono-diglycerides and/or unsaturated lactylated mono-diglycerides are present in an amount of 0.05% to 1.0%, preferably about 0.1% to 0.6% by weight of the food intermediate.

In a broad aspect the present invention provides a process for the production of a frozen food product comprising the step of contacting a food intermediate with an emulsifier system, wherein the emulsifier system comprises compounds of formula I:

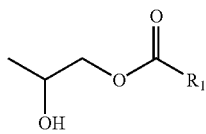

Formula I wherein $R_1$ is a hydrocarbon group; and wherein the frozen food product comprises ice crystals with sizes (D(50,3)) of less than 30 μm, preferably less then 28 μm, more preferably less than 24 μm.

In a broad aspect the present invention provides a process for the production of a frozen food product comprising the step of contacting a food intermediate with an emulsifier system, wherein the emulsifier system comprises compounds of formula I:

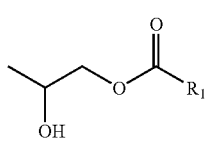

Formula I wherein $R_1$ is a hydrocarbon group; and wherein the frozen food product is subjected to a heat shock and subsequently comprises ice crystals with sizes (D(50,3)) of less than 30 μm.

In a broad aspect the present invention provides use of an emulsifier system to improve the texture of yoghurt through a water-binding effect, wherein the emulsifier system comprises compounds of formula I:

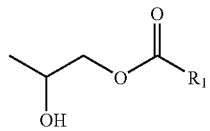

Formula I wherein $R_1$ is a hydrocarbon group.

In a further broad aspect the present invention provides use of an emulsifier system to inhibit lactose crystallisation in a frozen food product, preferably ice cream or a frozen dessert, wherein the emulsifier system comprises compounds of formula I:

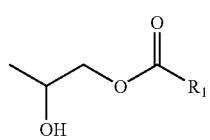

Formula I wherein $R_1$ is a hydrocarbon group.

Aspects of the invention are defined in the appended claims.

EXAMPLES

Example 1

Figure 1:
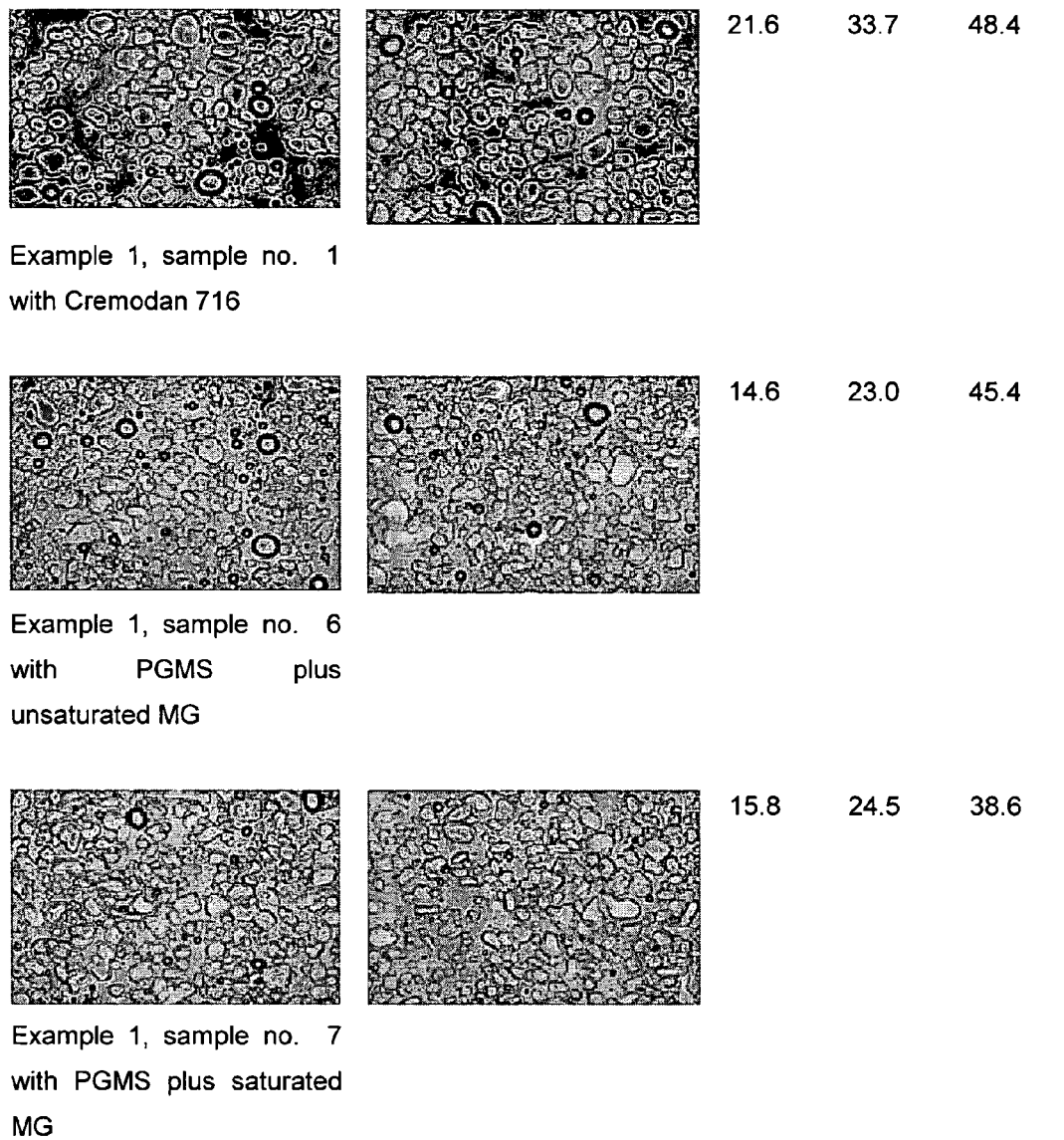
FIG. 1 shows ice crystal images from light microscopy.
Figure 2:
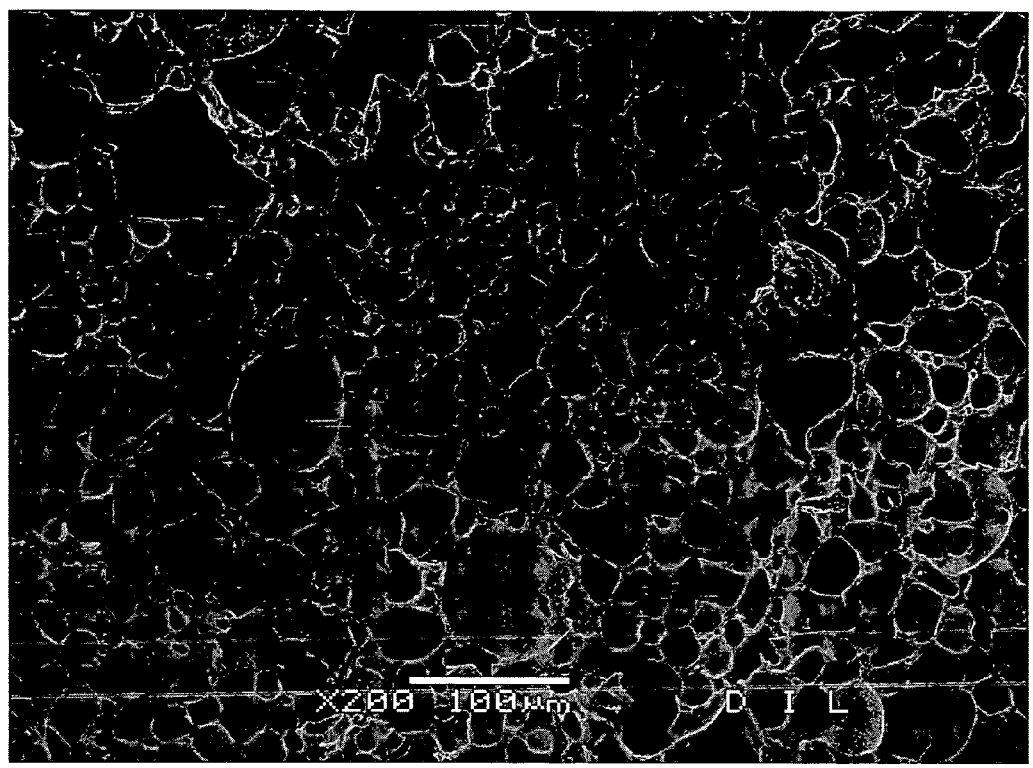
FIG. 2 is a scanning electron micrograph of an ice cream sample (Example 5, sample no. 1), produced with CREMODAN® SE 315 in an amount of 0.55%.
Figure 3:
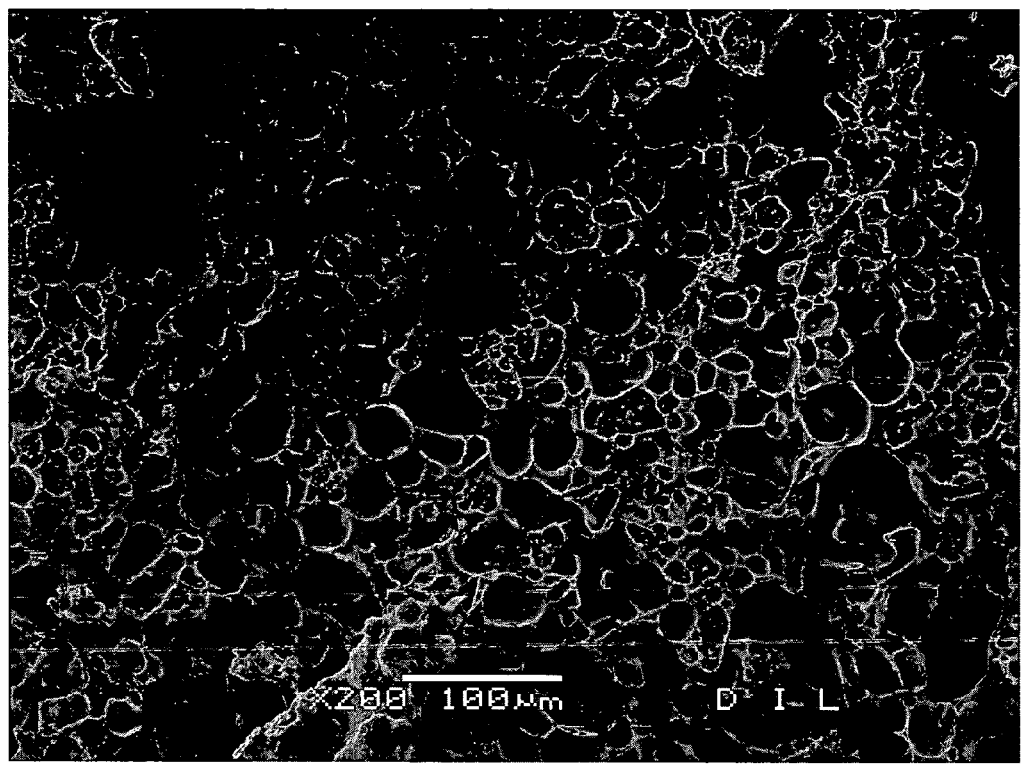
FIG. 3 is a scanning electron micrograph of an ice cream sample (Example 5, sample no. 2), produced with GRINDSTED® PGMS SPV in an amount of 0.30%.

Ice cream was prepared using the ingredients described in Table 1 using a conventional freezer as a whipper. The ice-cream had an overrun of 120%. The drawing temperature from the freezer outlet was constant at −5.5° C. After whipping the ice cream in the freezer, the product were filled into containers, conventionally hardened in a hardening tunnel at −25° C. and stored at −25° C.

TABLE 1

| | Sample Number | | | | | | | |
|---|---|---|---|---|---|---|---|---|
| | 1 | 2 | 3 | 4 | 5 | 6 | 7 | 8 |
| Water | 64.000 | 64.080 | 64.200 | 64.080 | 64.030 | 63.930 | 63.930 | 64.000 |
| Polawar 70 | 8.000 | 8.000 | 8.000 | 8.000 | 8.000 | 8.000 | 8.000 | 8.000 |
| Skimmed Milk Powder | 11.000 | 11.000 | 11.000 | 11.000 | 11.000 | 11.000 | 11.000 | 11.000 |
| Sucrose | 16.000 | 16.000 | 16.000 | 16.000 | 16.000 | 16.000 | 16.000 | 16.000 |
| GRINDSTED ® STS 30 | — | — | — | 0.300 | — | — | — | 0.030 |
| DIMODAN ® UP/B | — | — | 0.180 | — | 0.050 | 0.150 | — | 0.050 |
| DIMODAN ® HR | — | — | — | — | — | — | 0.150 | — |
| GRINDSTED ® PGMS SPV | — | 0.300 | — | — | 0.300 | 0.300 | 0.300 | 0.300 |
| Guar gum (E412) | — | 0.200 | 0.200 | 0.200 | 0.200 | 0.200 | 0.200 | 0.200 |
| Carrageenan (E407) | — | 0.020 | 0.020 | 0.020 | 0.020 | 0.020 | 0.020 | 0.020 |
| CREMODAN ® SE 716 | 0.600 | — | — | — | — | — | — | — |
| Vanilla Flavouring | 0.300 | 0.300 | 0.300 | 0.300 | 0.300 | 0.300 | 0.300 | 0.300 |
| Colouring (Annatto) | 0.100 | 0.100 | 0.100 | 0.100 | 0.100 | 0.100 | 0.100 | 0.100 |
| TOTAL | 100.000 | 100.000 | 100.000 | 100.000 | 100.000 | 100.000 | 100.000 | 100.000 |

Polawar 70 is a hardened palm kernel oil from Aarhus United.
GRINDSTED ® STS 30 is a sorbitan tristearate from Danisco A/S.
DIMODAN ® UP/B is an unsaturated distilled monoglyceride from Dansico A/S.
DIMODAN ® HR is distilled saturated monoglyceride from Danisco A/S.
GRINDSTED ® PGMS SPV is and propylene glycol monoester from Danisco A/S.
CREMODAN ® SE 716 is a conventional emulsifier/stabiliser blend (E471, E410, E412) from Danisco A/S.
Sample no. 1 Ice cream made with CREMODAN ® SE 716 (0.60%) as the emulsifier system
Sample no. 2 Ice cream made with PGMS (0.30%) as the emulsifier system
Sample no. 3 Ice cream made with unsaturated monoglycerides (0.18%) as the emulsifier system
Sample no. 4 Ice cream made with sorbitan tristearate (0.30%) as the emulsifier system
Samples no. 5 Ice cream made with PGMS (0.30%) + unsaturated monoglyceride (0.05%) as the emulsifier system
Sample no. 6 Ice cream made with PGMS (0.30%) + unsaturated monoglyceride (0.15%) as the emulsifier system
Sample no. 7 Ice cream made with PGMS (0.30%) + saturated monoglyceride as the emulsifier system
Sample no. 8 Ice cream made with PGMS (0.30%) + unsaturated monoglyceride (0.05%) + sorbitan tristearate as the emulsifier system One set of ice cream samples was analysed fresh (after 5 days storage at −25° C., followed by one day at −18° C.) for ice crystal size using image analysis and light microscopy at −15° C. The ice crystal analysis was done according to the following method.

Ice Crystal Size Distribution by Light Microscopy

Principle: In a temperature-controlled refrigerated glove box ice crystals isolated from the ice cream were studied by image analysis. From this ice crystal size distribution analysis is generated. The measurement of ice crystal sizes is a good supplement to the evaluation of textural properties in ice cream.

Sample preparation: On a steel board inside the glove box at a temperature of −15° C. a pinch of ice cream was suspended in one drop of n-butanol and dispersed by squeezing between two microscope slides until the sample appears homogenous by visual inspection. This sample preparation results in a mono-layer of ice crystals with a few percent of overlapping crystals. The air bubbles were removed to a large extent by the n-butanol treatment. 150 to 300 of crystals were analysed for the determination of one crystal size distribution.

Refrigerated glove box: The insulated, refrigerated glove box was equipped with a 3-layered thermo window and two gloves for manipulation of samples inside the box. A Nikon Eclipse E400 microscope was housed in the centre of the box. The photo eyepieces were not used. Instead samples were inspected on a computer screen using a video camera placed on top of the microscope. The microscope stage was operated from outside the box by means of cables. A compressor with a closed circuit, a heater and a thermostatic control ensure temperature control of +/−0.5° C. on the stage within −5 to −25° C. (−15° C. in this study). Three additional thermometers were used to monitor temperature at various positions in the box.

Image analysis: An image of the ice crystal dispersion was printed out, and the ice crystal boundaries were highlighted manually. By using different colours (red and green) on the black and white print (grey scale) it was possible to distinguish between overlaying crystals. Image analysis was performed with Adobe PhotoShop and Microsoft Excel software programs. Based on statistical calculation, the number distribution and the volume distribution were presented as graphs along with the 10, 50 and 90% quartiles.

Table 2 show the results of the ice crystal size analysis of the fresh samples.

TABLE 2

| | Sample Number | | | | | | | |
|---|---|---|---|---|---|---|---|---|
| | 1 | 2 | 3 | 4 | 5 | 6 | 7 | 8 |
| D(10.3) | 21.6 μm | 19.7 μm | 28.6 μm | 28.7 μm | 18.3 μm | 14.6 μm | 15.8 μm | 17.5 μm |
| D(50.3) | 33.7 μm | 30.8 μm | 45 μm | 43.6 μm | 28.9 μm | 23 μm | 24.5 μm | 28.3 μm |
| D(90.3) | 48.4 μm | 41.6 μm | 60 μm | 60.8 μm | 44.6 μm | 45.4 μm | 38.6 μm | 42.4 μm |

Examples of ice crystal images from this study can be seen in FIG. 1.

Another set of ice cream was subjected to heat shock. The products were tempered and stored in a freezer cabinet at −18° C. for one day. When the products had been tempered, they were placed in a heat shock freezer cabinet with a temperature varying between −20° C. and −5° C. every 6 hours. The products were kept in this freezer cabinet for 7 days. All samples—both fresh and heat shock-treated—were tempered at −18° C. for 2 days before being analysed.

Table 3 shows the result of the ice crystal analysis of the heat shock treated products.

TABLE 3

| | Sample Number | | | | | | | |
|---|---|---|---|---|---|---|---|---|
| | 1 | 2 | 3 | 4 | 5 | 6 | 7 | 8 |
| D(10.3) | 42.9 μm | 30.7 μm | 57.7 μm | 65.9 μm | 28.1 μm | 21.2 μm | 17.9 μm | 32.1 μm |
| D(50.3) | 61 μm | 48.2 μm | 84 μm | 94.3 μm | 40.9 μm | 38.7 μm | 30.4 μm | 49.8 μm |
| D(90.3) | 82.9 μm | 74.2 μm | 113.2 μm | 123.2 μm | 60.7 μm | 55.3 μm | 55.9 μm | 74 μm |

As can be seen from the ice crystal analysis, the best result (smallest ice crystals) was obtained with PGMS+monodiglycerides (samples 5, 6 and 7). Of these 3 samples the best result (smallest ice crystals) was obtained with PGMS+saturated mono-diglycerides (sample 7) both fresh and after heat shock treatment. These trials also show that sorbitan tristearate and unsaturated mono-diglycerides used as single emulsifiers do not function as single emulsifiers with regards to ice crystal growth inhibition. Sorbitan tristearate even has a detrimental effect on the ice crystal growth inhibition. This can be seen by comparing the ice crystal sizes in sample 5 and 8 after heat shock treatment. Sample no. 7 grew about 460% less than ice crystals in the ice cream with a conventional emulsifier and stabiliser system (sample no. 1).

Example 2

Ice cream was prepared using the ingredients described in Table 4 using a conventional freezer as a whipper. The ice cream had an overrun of 120%. The drawing temperature from the freezer outlet was constant at −5.5° C. After whipping the ice cream in the freezer, the product were filled into containers, conventionally hardened in a hardening tunnel at −25° C. and stored at −25° C.

TABLE 4

| | Sample Number | | | |
|---|---|---|---|---|
| Composition in percentages | 1 | 2 | 3 | 4 |
| Water | 64.160 | 64.010 | 63.860 | 63.810 |
| Polawar 70 | 8.000 | 8.000 | 8.000 | 8.000 |

TABLE 4-continued

| | Sample Number | | | |
|---|---|---|---|---|
| Composition in percentages | 1 | 2 | 3 | 4 |
| Skimmed Milk Powder | 7.700 | 7.700 | 7.700 | 7.700 |
| Demineralised whey powder | 3.300 | 3.300 | 3.300 | 3.300 |
| Sucrose | 12.000 | 12.000 | 12.000 | 12.000 |
| Glucose Syrup Powder, 32 DE | 4.230 | 4.230 | 4.230 | 4.230 |
| GRINDSTED ® PGMS SPV | 0.150 | 0.300 | 0.450 | 0.500 |
| Guar gum | 0.200 | 0.200 | 0.200 | 0.200 |

TABLE 4-continued

| | Sample Number | | | |
|---|---|---|---|---|
| Composition in percentages | 1 | 2 | 3 | 4 |
| Carrageenan | 0.020 | 0.020 | 0.020 | 0.020 |
| Vanilla Flavouring | 0.140 | 0.140 | 0.140 | 0.140 |
| Colouring (Annatto) | 0.100 | 0.100 | 0.100 | 0.100 |
| TOTAL | 100.000 | 100.000 | 100.000 | 100.000 |

In this trial PGMS was used as the single emulsifier in different dosages.

One set of ice cream samples was analysed fresh (after 2 days storage at −25° C., followed by one day at −18° C.) for ice crystal size using image analysis and light microscopy at −15° C. Table 5 show the results of the ice crystal size analysis of the fresh samples.

TABLE 5

| | Sample Number | | | |
|---|---|---|---|---|
| | 1 | 2 | 3 | 4 |
| D(10.3) | 22.7 μm | 15.5 μm | 13.1 μm | 12.4 μm |
| D(50.3) | 33.7 μm | 23.6 μm | 19.3 μm | 18.1 μm |
| D(90.3) | 46.3 μm | 36.6 μm | 28.6 μm | 25.8 μm |

As can be seen from Table 5, the ice crystal size decreases with increasing dosage of PGMS.

Example 3

Ice cream was prepared using the ingredients described in Table 6 using a conventional freezer as a whipper. The ice cream had an overrun of 120%. The drawing temperature from the freezer outlet was adjusted to −3.0° C., −4.0° C., −5.0° C. and −6.0° C. After whipping the ice cream in the freezer, the product were filled into containers, conventionally hardened in a hardening tunnel at −25° C. and stored at −25° C.

TABLE 6

| Composition in percentages | Sample Number 1 |
|---|---|
| Water | 64.030 |
| Polawar 70 | 8.000 |
| Skimmed Milk Powder | 7.700 |
| Demineralised whey powder | 3.300 |
| Sucrose | 12.000 |
| Glucose Syrup Powder 32 DE | 4.210 |
| GRINDSTED ® PGMS SPV | 0.300 |
| Guarmel 1400 | 0.200 |
| Carrageenan 2071 | 0.020 |
| Vanilla Flavouring NI U35644 | 0.140 |
| Colouring (Annatto) | 0.100 |
| TOTAL | 100.000 |

One set of ice cream samples was analysed fresh (after 3 days storage at −25° C., followed by one day at −18° C.) for ice crystal size using image analysis and light microscopy at −15° C. Table 7 shows the results of the ice crystal size analysis of the fresh samples.

TABLE 7

| | Drawing Temperature | | | |
|---|---|---|---|---|
| | −3° C. | −4° C. | −5° C. | −6° C. |
| D(10.3) | 25.7 μm | 15.3 μm | 14.5 μm | 11.9 μm |
| D(50.3) | 35.8 μm | 21.9 μm | 20.6 μm | 17.1 μm |
| D(90.3) | 52.4 μm | 30.7 μm | 29.3 μm | 28.3 μm |

From Table 7 it can be seen that PGMS only works when a certain amount of shear is applied to the ice cream in the ice cream freezer, indicating that PGMS does not work under quiescent conditions.

Example 4

Ice cream mix was prepared using the ingredients described in Table 6. The PGMS was added to the mix in two different ways. One way was to add the emulsifiers to the melted fat at 50° C. followed by addition of the fat phase to the rest of the mix followed by homogenisation/pasteurisation/cooling. Another way was to add the emulsifier directly to the water phase at 50° C. followed by addition of the rest of the ingredients followed by homogenisation/pasteurisation/cooling. After 24 hours of ageing, ice cream was prepared using a conventional freezer as a whipper. The ice cream had an overrun of 120%. The drawing temperature from the freezer outlet was constant at −5.5° C. After whipping the ice cream in the freezer, the product were filled into containers, conventionally hardened in a hardening tunnel at −25° C. and stored at −25° C.

One set of ice cream samples was analysed fresh (after 6 days storage at −25° C., followed by one day at −18° C.) for ice crystal size using image analysis and light microscopy at −15° C. Table 8 show the results of the ice crystal size analysis of the fresh samples.

TABLE 8

| | Addition to fat phase | Addition to water phase |
|---|---|---|
| D(10.3) | 14.5 μm | 14.5 μm |
| D(50.3) | 22.7 μm | 23.7 μm |
| D(90.3) | 31.7 μm | 36 μm |

As can be seen from Table 8, the way of adding the PGMS (either to the fat or to the water phase) does not have any influence on the functionality of PGMS with regards to ice crystal control.

Example 5

Ice cream was prepared using the ingredients described in Table 9 using a conventional freezer as a whipper. The ice cream had an overrun of 120%. The drawing temperature from the freezer outlet was constant at −5.5° C. After whipping the ice cream in the freezer, the product were filled into containers, conventionally hardened in a hardening tunnel at −25° C. and stored at −25° C.

TABLE 9

| Composition in percentages | 1 | 2 |
|---|---|---|
| Polawar 70 | 7.90 | 7.90 |
| Skimmed Milk Powder | 5.45 | 5.45 |
| Demineralised whey powder | 5.50 | 5.50 |
| Sucrose | 11.00 | 11.00 |
| Glucose syrup LB 9, 80 TS | 7.50 | 7.50 |
| CREMODAN ® SE 315 Emulsifier & Stabiliser System | 0.55 | — |
| GRINDSTED ® PGMS SPV Propylene Glycol Ester | — | 0.30 |
| Guar gum | — | 0.20 |
| Carrageenan | — | 0.02 |
| Vanilla Flavouring | 0.12 | 0.12 |
| Colouring (Annatto) | 0.10 | 0.10 |
| Water | 61.88 | 61.91 |
| Total | 100.00 | 100.00 |

CREMODAN ® SE 315 is a conventional emulsifier and stabiliser system (E471, E410, E412) from Danisco A/S One set of ice cream samples was analysed fresh (after 2 days storage at −25° C., followed by one day at −18° C.) for ice crystal size using image analysis and light microscopy at −15° C. Table 10 show the results of the ice crystal size analysis of the fresh samples.

TABLE 10

| | Sample Number | |
|---|---|---|
| | 1 | 2 |
| D(10.3) | 20.1 μm | 11.7 μm |
| D(50.3) | 31.2 μm | 17.1 μm |
| D(90.3) | 47.7 μm | 25.4 μm |

From Table 10 it can be seen that the ice cream sample with PGMS (sample no. 2) has much smaller ice crystals than the sample made with a conventional emulsifier/stabiliser system (sample no. 1).

Another set of ice creams was subjected to heat shock. The products were tempered and stored in a freezer cabinet at −18° C. for one day. When the products had been tempered, they were placed in a heat shock freezer cabinet with a temperature varying between −20° C. and −5° C. every 6 hours. The products were kept in this freezer cabinet for 7 days.

All samples—both fresh and heat shock-treated—were tempered at −18° C. for 1 days before being analysed.

Table 11 shows the result of the ice crystal analysis of the heat shock treated products.

Example 6

Test in Different Fat Types: Ice cream was prepared using the ingredients described in Table 12 using a conventional freezer as a whipper. The ice cream had an overrun of 120%. The drawing temperature from the freezer outlet was constant at −5.5° C. After whipping the ice cream in the freezer, the products were filled into containers, conventionally hardened in a hardening tunnel at −25° C. and stored at −25° C.

TABLE 12

| Recipe in Percent | Sample Number | | | | | |
|---|---|---|---|---|---|---|
| | 1 | 2 | 3 | 4 | 5 | 6 |
| BENEFAT ® D | 7.90 | — | — | — | — | — |
| Polawar 70 | — | 7.90 | — | — | — | — |
| Cocowar HCNO 31 | — | — | 7.90 | — | — | — |
| Butter Oil (AMF) | — | — | — | 7.90 | — | — |
| Butter | — | — | — | — | 9.60 | — |
| Cream, 38% Fat | — | — | — | — | — | 20.80 |
| Skimmed Milk Powder | 5.45 | 5.45 | 5.45 | 5.45 | 5.25 | 4.25 |
| Demineralised whey powder | 5.50 | 5.50 | 5.50 | 5.50 | 5.50 | 5.50 |
| Sucrose | 11.00 | 11.00 | 11.00 | 11.00 | 11.00 | 11.00 |
| Glucose syrup LF 9, 80% TS | 7.00 | 7.00 | 7.00 | 7.00 | 7.00 | 7.00 |
| GRINDSTED ® PGMS SPV Propylene Glycol Ester | 0.30 | 0.30 | 0.30 | 0.30 | 0.30 | 0.30 |
| DIMODAN ® UP/B Distilled Monoglyceride | 0.05 | 0.05 | 0.05 | 0.05 | 0.05 | 0.05 |
| GRINDSTED ® STS 30 Sorbitan Tristearate | 0.03 | 0.03 | 0.03 | 0.03 | 0.03 | 0.03 |
| Guar gum | 0.20 | 0.20 | 0.20 | 0.20 | 0.20 | 0.20 |
| Carrageenan | 0.02 | 0.02 | 0.02 | 0.02 | 0.02 | 0.02 |
| Vanilla Flavouring | 0.12 | 0.12 | 0.12 | 0.12 | 0.12 | 0.12 |
| Colouring (Annatto) | 0.10 | 0.10 | 0.10 | 0.10 | 0.10 | 0.10 |
| Water | 62.33 | 62.33 | 62.33 | 62.33 | 60.83 | 50.63 |
| Total | 100.00 | 100.00 | 100.00 | 100.00 | 100.00 | 100.00 |

BENEFAT ® D is a Salatrim (mixture of short chain and long chain fatty acid esters of glycerol) commercially available from Danisco A/S.

TABLE 11

| | Sample Number | |
|---|---|---|
| | 1 | 2 |
| D(10.3) | 29.5 μm | 13.1 μm |
| D(50.3) | 48.1 μm | 21.0 μm |
| D(90.3) | 72.3 μm | 32.7 μm |

In Table 11 it can be seen again that the sample with PGMS grew about 430% less than the ice cream made with the conventional emulsifier and stabilizer system.

SEM (scanning electron microscopy) was used to study the structure, the ice crystal and gas bubble size distribution of the ice cream samples (see FIGS. 2 to 5).

Figure 4:
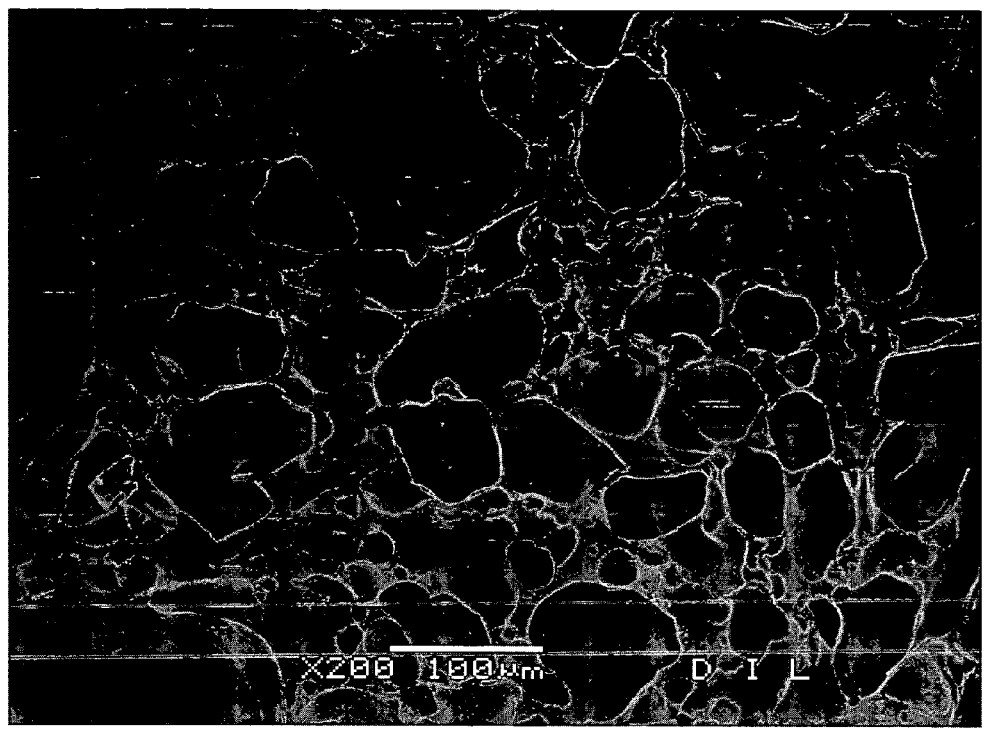
FIG. 4 is a scanning electron micrograph of an ice cream sample (Example 5, sample no. 1), produced with CREMODAN® SE 315 in an amount of 0.55%, after heat shock.
Figure 5:
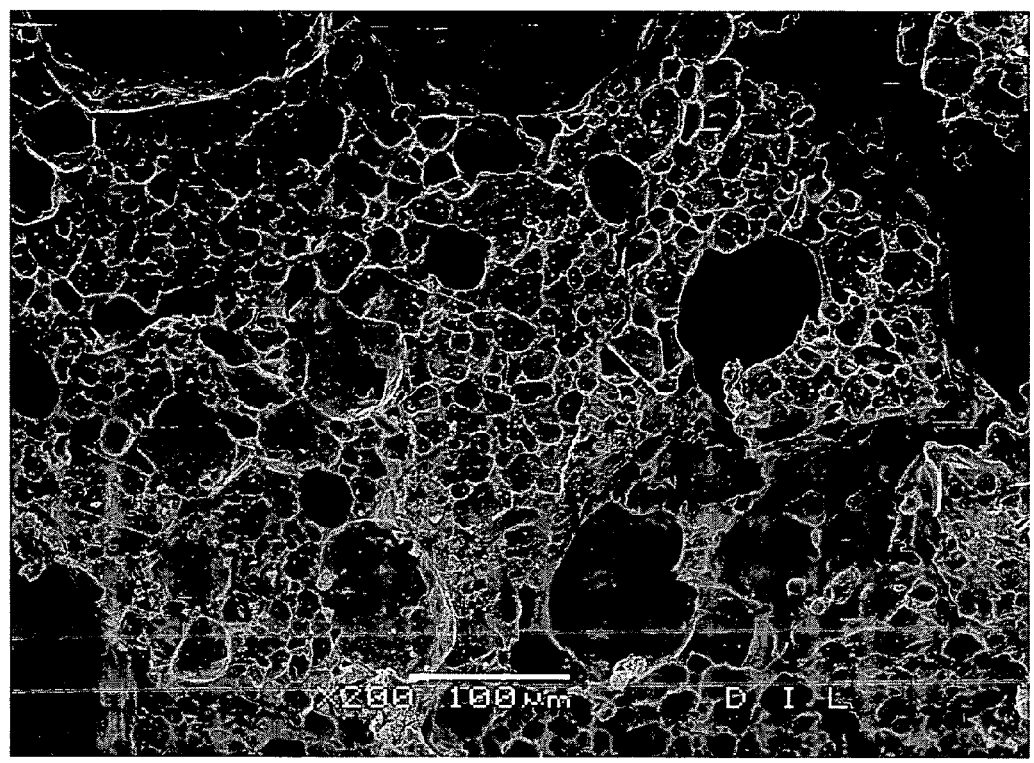
FIG. 5 is a scanning electron micrograph of an ice cream sample (Example 5, sample no. 2), produced with GRINDSTED® PGMS SPV in an amount of 0.30%, after heat shock.
Figure 6:
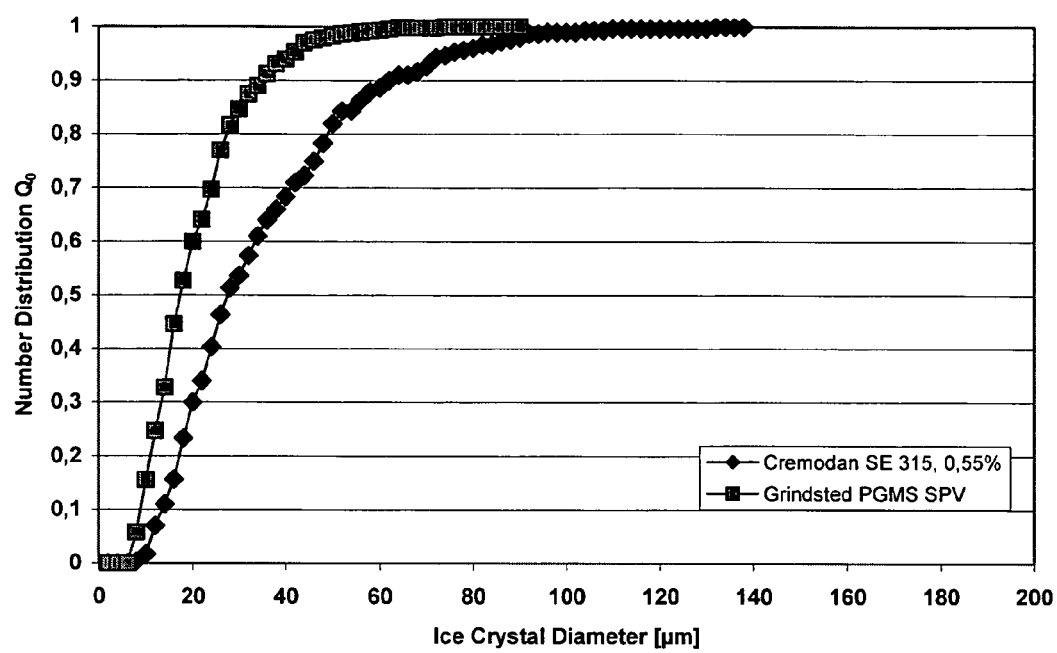
FIG. 6 is a graph comparing the ice crystal diameter number distribution in ice cream samples (Example 5), produced with CREMODAN® SE 315 (0.55%) and GRINDSTED® PGMS SPV (0.30%).
Figure 7:
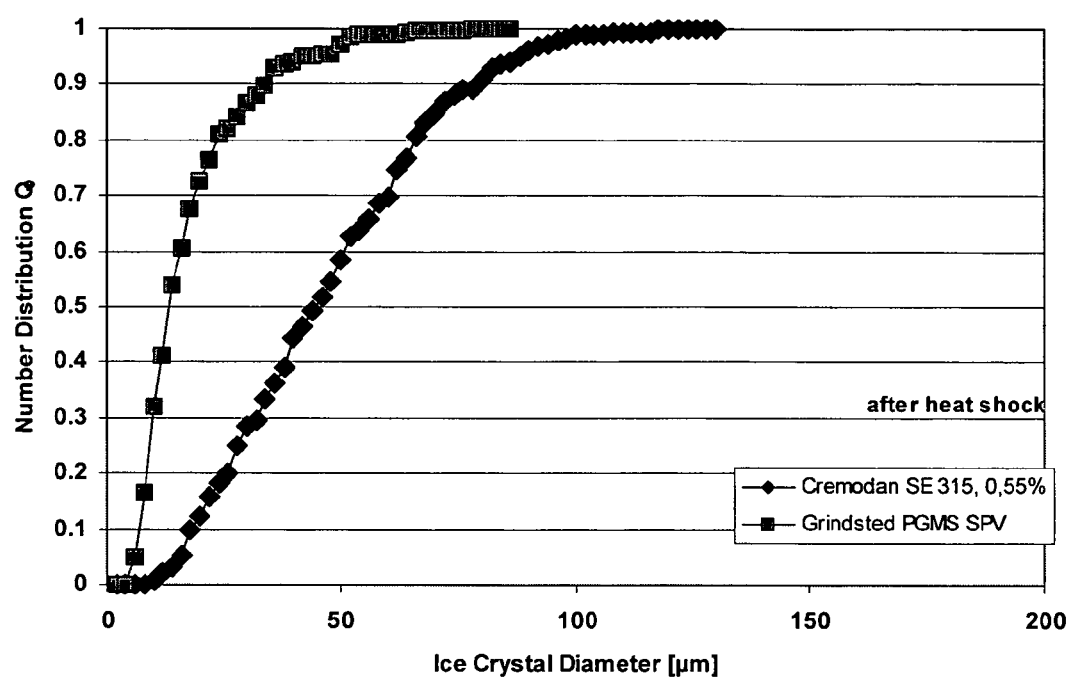
FIG. 7 is a graph comparing the ice crystal diameter number distribution in ice cream samples (Example 5), produced with CREMODAN® SE 315 (0.55%) and GRINDSTED® PGMS SPV (0.30%), after heat shock.

Summary of SEM study: PGMS give very small ice crystal (FIG. 3) that grow very little after heat shock (FIG. 5). The ice crystals are bound in clusters. The ice cream with CREMODAN SE 315 gave larger ice crystals (FIG. 2) that grow much more after heat shock (FIG. 4).

Figure 8:
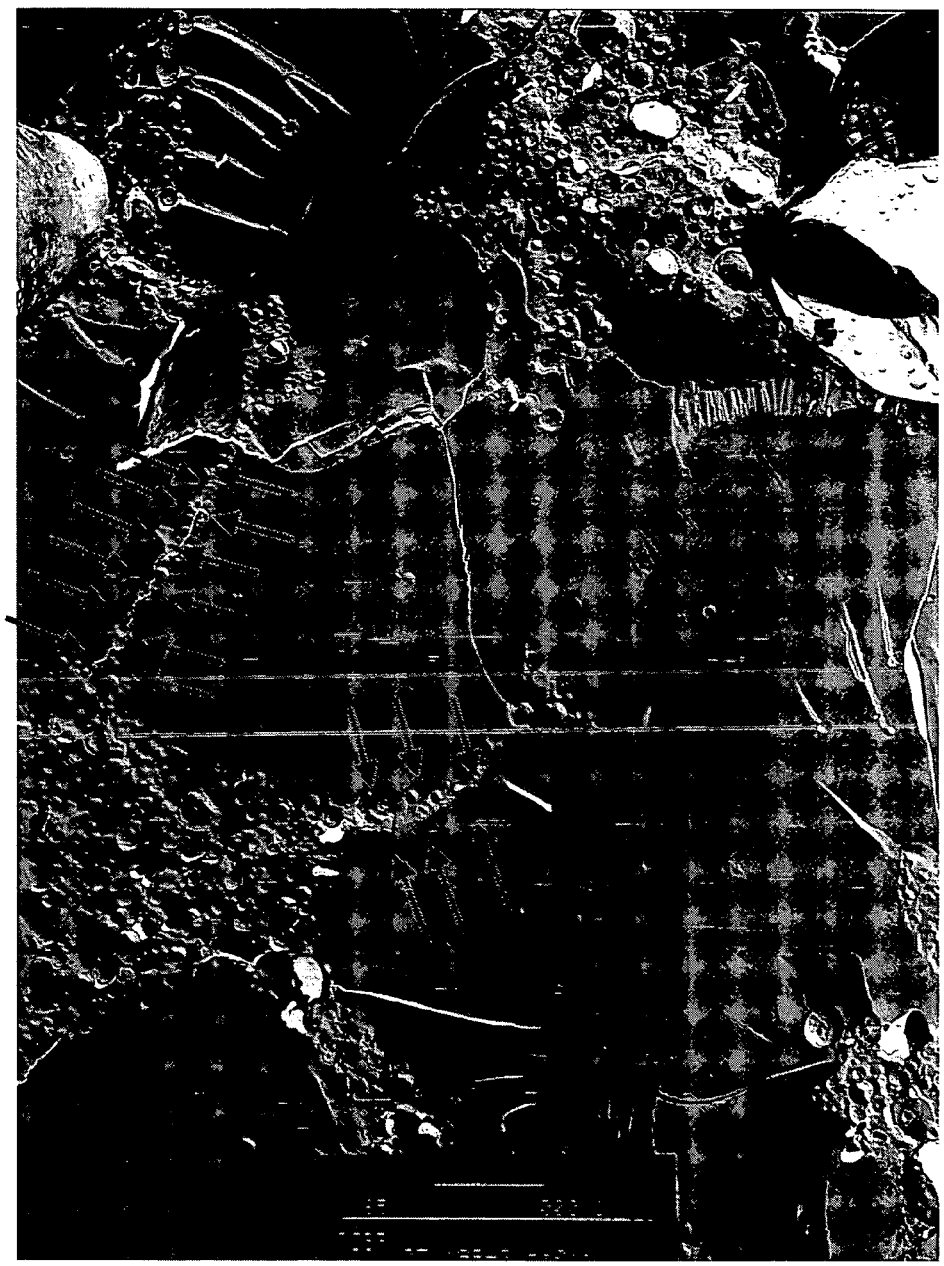
FIG. 8 is a transmission electron micrograph of an ice cream sample, (example 5, sample no. 2) produced with GRINDSTED PGMS SPV in an dosage of 0.30%, before heat shock.

TEM (transmission electron microscopy) was done on sample no. 2 (not heat shocked). FIG. 8 shows a transmission electron micrograph of sample no. 2 where the physical blocking of the ice crystals by the hydrated fat globules can be seen. The physical blocking of the ice crystals prevents them from growing/limits their growth.

One set of ice cream was subjected to heat shock. The products were tempered and stored in a freezer cabinet at −18° C. for one day. When the products had been tempered, they were placed in a heat shock freezer cabinet with a temperature varying between −20° C. and −5° C. every 6 hours. The products were kept in this freezer cabinet for 7 days. All samples were tempered at −18° C. for 2 days before being analysed.

Table 13 shows the result of the ice crystal analysis of the heat shock treated products.

TABLE 13

| | Volume Fraction | | |
|---|---|---|---|
| Fat Type | D(10.3) μm | D(50.3) μm | D(90.3) μm |
| BENEFAT ® D | 55.3 | 86.0 | 122.2 |
| HPKO | 18.1 | 30.2 | 42.5 |
| HCNO | 19.7 | 33.5 | 53.1 |
| Anhydrous Butter oil | 33.6 | 50.4 | 68.0 |
| Butter | 33.6 | 49.7 | 67.7 |
| Cream (38% fat) | 37.4 | 56.6 | 79.9 |

BENEFAT ® D which is an alpha-stable fat gives inferior effect. This shows that alpha fat crystals are not responsible for the ice crystal effect. HPKO and HCNO, which are high lauric fats and beta prime stable, give very good effects. Milk fat gives effects between BENEFAT ® D and lauric fats.

Example 7

Ice cream mix was prepared using the ingredients described in Table 14. The mix was homogenised at 78° C./175 bar and pasteurised at 84° C. for 20 sec. Followed by cooling to 5° C.

TABLE 14

| Composition in percentages | Sample Number | | |
|---|---|---|---|
|  | 1 | 2 | 3 |
| Polawar 70 | 8.00 | 8.00 | 8.00 |
| Demineralised whey powder | 10.50 | 10.50 | 10.50 |
| Sucrose | 12.00 | 12.00 | 12.00 |
| Glucose syrup powder, 32 DE | 4.21 | 4.21 | 4.21 |
| CREMODAN ® SE 716 Emulsifier & Stabiliser System | 0.60 | — | — |
| GRINDSTED ® PGMS SPV Propylene Glycol Ester | — | 0.30 | 0.30 |
| DIMODAN ® UP/B Distilled Monoglyceride | — | — | 0.05 |
| GRINDSTED ® STS 30 Sorbitan Tristerate | — | — | 0.03 |
| Guar gum | — | 0.20 | 0.20 |
| Carrageenan | — | 0.02 | 0.02 |
| Vanilla Flavouring | 0.12 | 0.12 | 0.12 |
| Colouring (Annatto) | 0.10 | 0.10 | 0.10 |
| Water | 64.47 | 64.55 | 64.47 |
| Total | 100.00 | 100.00 | 100.00 |

2 g ice cream mix was mixed with 20 g demineralised water and stirred for 2 hrs. The mixture was analysed for particle size on a Malvern Mastersizer 1000.

The result of the particle size analysis is shown in Table 15.

TABLE 15

|  | Sample Number | | |
|---|---|---|---|
|  | 1 | 2 | 3 |
| Main peak at approx. | 1.0 μm | 2.0 μm | 2.0 μm |

This indicates that the fat globules in sample no. 2 and 3 containing PGMS have taken up water (have swelled) and increased in size, compared to sample no. 1 which contains a traditional emulsifier/stabiliser blend.

Example 8

Aged ice cream mix from example 7 were ultra-centrifuged at 5° C. and the fat phases (cream layers) were isolated for X-ray measurements. X-ray measurements shows no indication of alpha crystal stability in any of the samples. All samples had beta-prime crystal structure.

In WO 01/06865 (Societe des Produits Nestle S.A.) it is claimed that alpha fat crystals are important for the ice crystal grow inhibition effect, which is not supported by our findings.

Example 9

Ice cream was prepared using the ingredients described in Table 16 using a conventional freezer as a whipper. The ice cream had an overrun of 120%. The drawing temperature from the freezer outlet was constant at –5.5° C. After whipping the ice cream in the freezer, the product were filled into containers, conventionally hardened in a hardening tunnel at –25° C. and stored at –25° C.

TABLE 16

| Composition in percentages | 1 | 2 | 3 | 4 |
|---|---|---|---|---|
| Polawar 70 | 8.00 | 8.00 | 8.00 | 8.00 |
| Skimmed milk powder | 7.70 | 7.70 | 7.70 | 7.70 |
| Demineralised whey powder | 3.30 | 3.30 | 3.30 | 3.30 |
| Sucrose | 12.00 | 12.00 | 12.00 | 12.00 |
| Glucose syrup powder, 32 DE | 4.21 | 4.21 | 4.21 | 4.21 |
| CREMODAN ® SE 716 Emulsifier & Stabiliser System | 0.60 | — | — | — |
| GRINDSTED ® PGMS SPV Propylene Glycol Ester | — | — | 0.60 | — |
| GRINDSTED ® ACETEM 50-00 Acetic Acid Ester | — | 0.60 | — | — |
| GRINDSTED ® LACTEM P22 Lactic Acid Ester | — | — | — | 0.35 |
| Guar gum | — | 0.20 | 0.20 | 0.20 |
| Carrageenan | — | 0.02 | 0.02 | 0.02 |
| Vanilla Flavouring | 0.14 | 0.14 | 0.14 | 0.14 |
| Colouring (Annatto) | 0.10 | 0.10 | 0.10 | 0.10 |
| Water | 63.95 | 63.73 | 64.73 | 93.98 |
| Total | 100.00 | 100.00 | 100.00 | 100.00 |

GRINDSTED ® ACETEM 50-00 Acetic Acid Ester is an acetic acid ester of mono-diglycerides from Danisco A/S.
GRINDSTED ® LACTEM P 22 Lactic Acid Ester is an lactic acid ester of mono-diglycerides from Danisco A/S.

One set of ice cream samples was analysed fresh (after 2 days storage at –25° C., followed by one day at –18° C.) for ice crystal size using image analysis and light microscopy at –15° C. Table 17 show the results of the ice crystal size analysis of the fresh samples.

TABLE 17

|  | Sample Number | | | |
|---|---|---|---|---|
|  | 1 | 2 | 3 | 4 |
| D(10.3) | 22.1 μm | 22.5 μm | 10.5 μm | 19.9 μm |
| D(50.3) | 34.5 μm | 34.7 μm | 15.0 μm | 32.0 μm |
| D(90.3) | 50.9 μm | 46.3 μm | 21.0 μm | 46.8 μm |

As can be seen from Table 17, acetic acid ester and lactic acid ester of mono-diglycerides do not demonstrate any effect on ice crystal size compared to a traditional emulsifier/stabiliser system (sample no. 1). As can be seen PGMS, here used in a high dosage, gives very small ice crystals.

Example 10

Ice cream was prepared using the ingredients described in Table 18 using a conventional freezer as a whipper. The ice cream had an overrun of 100%. The drawing temperature from the freezer outlet was constant at –5.0° C. After whipping the ice cream in the freezer, the product were filled into containers, conventional hardened in a hardening tunnel at –25° C. and stored at –25° C.

TABLE 18

| | Sample no. | | | | | | |
|---|---|---|---|---|---|---|---|
| | 1 | 2 | 3 | 4 | 5 | 6 | 7 |
| Water | 63.950 | 63.830 | 63.830 | 63.830 | 63.830 | 63.830 | 63.830 |
| Cocowar 31 | 8.000 | 8.000 | 8.000 | 8.000 | 8.000 | 8.000 | 8.000 |
| Skimmed milk powder | 8.700 | 8.700 | 8.700 | 8.700 | 8.700 | 8.700 | 8.700 |
| Whey powder | 2.600 | 2.600 | 2.600 | 2.600 | 2.600 | 2.600 | 2.600 |
| Sucrose | 12.000 | 12.000 | 12.000 | 12.000 | 12.000 | 12.000 | 12.000 |
| Glucose syrup powder, 32 DE | 4.000 | 4.000 | 4.000 | 4.000 | 4.000 | 4.000 | 4.000 |
| CREMODAN ® SE 30 | 0.550 | — | | — | — | — | — |
| GRINDSTED ® PGMS 90 | — | 0.300 | | — | — | 0.300 | 0.200 |
| PGMS (C:18) | — | — | 0.225 | 0.150 | 0.075 | — | — |
| PGMS (C:18:1) | — | — | 0.075 | 0.150 | 0.225 | — | — |
| DIMODAN ® HR | — | 0.150 | 0.150 | 0.150 | 0.150 | — | — |
| Guar gum (E 412) | — | 0.200 | 0.200 | 0.200 | 0.200 | 0.200 | 0.200 |
| Carrageenan (E 407) | — | 0.020 | 0.020 | 0.020 | 0.020 | 0.020 | 0.020 |
| DIMODAN ® UP/B | — | — | | — | — | 0.150 | 0.250 |
| Vanilla Flavouring | 0.100 | 0.100 | 0.100 | 0.100 | 0.100 | 0.100 | 0.100 |
| Colouring (Annatto) | 0.100 | 0.100 | 0.100 | 0.100 | 0.100 | 0.100 | 0.100 |
| Total | 100.000 | 100.000 | 100.000 | 100.000 | 100.000 | 100.000 | 100.00 |

Cocowar 31 is a hardened coconut oil from Aarhus United.
GRINDSTED ® PGMS 90 is a propylene glycol monoester from Danisco A/S.
CREMODAN ® SE 30 is a conventional emulsifier/stabilizer blend (E 471, E 410, E 401, E 412, E407) from Dansico A/S.
PGMS (C:18) is an experimental sample of a PGMS based on stearic fatty acids, that is a saturated PGMS.
PGMS(C:18:1) is an experimental samples of a PGMS based on oleic fatty acids, that is an unsaturated PGMS.

One set of ice cream samples was analysed for meltdown performance. The meltdown rate (drip rate) of the ice creams was tested according to the following method.

A rectangular piece of ice cream (125 cc, dimension: approx. 100 mm×50 mm×25 mm), which had been stored at −18° C. for at least 24 hours, was weighed and placed on a grid. The room, in which the melting took place, was kept at a constant temperature of 22° C.±1° C. The grid was placed above a 500 ml glass beaker placed on an analytical balance.

The analytical balances were linked to a computer, which made registrations (one measurement each 2 minutes) and calculated the amount of melted ice cream as a function of time. After two hours a graph of the melting behaviour could be drawn.

Table 19 shows the amount of ice cream melted through the grid after 2 hours.

TABLE 19

| | Sample no. | | | | | | |
|---|---|---|---|---|---|---|---|
| | 1 | 2 | 3 | 4 | 5 | 6 | 7 |
| Amount melted trough the grid after 2 hours | 92% | 77% | 75% | 64% | 51% | 29% | 23% |

As can be seen from table 19 the highest melting resistance was obtained with unsaturated mono-glycerides (samples 6 and 7) followed by unsaturated PGMS (samples 4 and 5).

Another set of ice cream was subjected to heat shock. The products were tempered and stored in a freezer cabinet at −18° C. for one day. When the products had been tempered, they were placed in a heat shock freezer cabinet with a temperature varying between −20° C. and −5° C. every 6 hours. The products were kept in this freezer cabinet for 7 days. After this heat shock treatment the ice cream were tempered at −18° C. for 2 days before being analysed. The ice cream samples were analysed for ice crystal size. Table 20 shows the result of the ice crystal analysis of the fresh (D(50,3)) and heat shock treated (D(10,3), D(50,3) and D(90,3)) samples.

TABLE 20

| | Sample no. | | | | | | |
|---|---|---|---|---|---|---|---|
| | 1 | 2 | 3 | 4 | 5 | 6 | 7 |
| Fresh/D(50.3) | 43.4 μm | 21.5 μm | 22.3 μm | 25.2 μm | 33.4 μm | 22.6 μm | 20.6 μm |
| D(10.3) | 52.2 μm | 14.8 μm | 15.5 μm | 17.5 μm | 27.3 μm | 13.5 μm | 23.0 μm |
| D(50.3) | 78.2 μm | 25.4 μm | 25.3 μm | 28.9 μm | 41.8 μm | 26.5 μm | 36.9 μm |
| D(90.3) | 105.9 μm | 38.9 μm | 37.6 μm | 55.3 μm | 69.7 μm | 40.4 μm | 55.6 μm |

As can be seen from the ice crystal analysis, the smallest ice crystals were obtained with PGMS plus mono-glycerides (samples 2-7). Unsaturated PGMS in an amount of 0.15% or 0.225% (samples 4 and 5) did not give as small ice crystals as saturated mono-glycerides (sample 2). Decreasing the amount of PGMS and increasing the amount of mono-glycerides also gives bigger ice crystals (sample 7 compared to sample 6).

Also the air bubble size of the samples before and after the heat shock were determined. The results are presented in the below table.

TABLE 21

| Sample | Air bubble size/ fresh/D(50.3) | Air bubble size/ heat shocked/D(50.3) |
|---|---|---|
| 1 | 40.2 | 36.6 |
| 2 | 35.1 | 46.9 |
| 3 | 31.1 | 31.6 |
| 4 | 44.6 | 38.2 |
| 5 | 36.2 | 49.2 |
| 6 | 31.9 | 31.3 |
| 7 | 42.0 | 50.2 |

Unsaturated emulsifier(s) should not be overdosed. As can be seen from samples 5 and 7, the use of larger amounts of unsaturated emulsifiers gives growth in air bubble size in addition to ice crystal size.

PGMS used alone as an emulsifier gives small ice crystals in ice cream, but the air bubble stability is poor. It is similar to that in an ice cream without any added emulsifiers. Good air bubble stability can be achieved by adding small amounts (0.15%) of saturated or unsaturated mono-diglycerides with PGMS (0.3%). At the same time a further reduction in ice crystal size is obtained. The better air stability results in better melt down stability. Further improvement in melt down stability can be obtained by using Locust Gean Gum (LBG) in the recipe.

The fatty acid content in commercial PGMSs is composed of varying contents of C16 and C18 fatty acids. A preferred composition contains more 50% but and less than 95% of C18 fatty acids.

A further advantage of high C18 content is better powder quality and handling properties. A preferred fatty acid composition of PGMS is 0-50%, more preferably 5-10%, of C16 fatty acid(s) and 50-95%, more preferably 90-95%, of C18 fatty acid(s).

For improved meltdown stability unsaturated PGMS may be used. The preferred fatty acid composition of PGMS is 0-50%, more preferably 0%, of C16 fatty acid(s) and 50-95%, more preferably 50%, of C18 fatty acid(s) and 25-50%, more preferably 50%, of C18:1 fatty acid(s).

Example 11

Recipe of sample 2 from example 10 was used for producing ice cream using different freezing processing. One set of ice cream was prepared using a conventional freezer as a whipper. The ice cream had an overrun of 100%. The drawing temperature from the freezer outlet was constant at −5.0° C. After whipping the ice cream in the freezer, the product were filled into containers, conventional hardened in a hardening tunnel at −25° C. and stored at −25° C. These samples can be characterized as being produced using conventional freezing process.

Another set of ice cream was prepared using a conventional freezer as a whipper. The ice cream had an overrun of 100%. The drawing temperature from the freezer outlet was constant at −5.0° C. After whipping the ice cream in the freezer the ice cream was feed into a so called low temperature freezer (as disclosed in WO 2004/062883 A1, a low temperature extruder), the products were drawn from the low temperature extruder at a temperature of −12° C. and were filled into containers, conventional hardened in a hardening tunnel at −25° C. and stored at −25° C. The ice cream had an overrun of 100% after extrusion. These samples can be characterized as being produced using low temperature extrusion process. Low temperature extrusion of ice cream is used among other things to achieve smaller ice crystals in the fresh ice cream The ice cream samples were analysed for ice crystal size. Table 22 shows the result of the ice crystal analysis of the fresh samples.

TABLE 22

| | Processing used | |
|---|---|---|
| | Conventional freezing | Low temperature extrusion |
| D(10.3) | 17.9 μm | 16.7 μm |
| D(50.3) | 24.1 μm | 23.2 μm |
| D(90.3) | 32.7 μm | 32.2 μm |

As can be seen from table 22, low temperature extrusion only had a very little influence on the ice crystal size compared to conventional processing, when a PGMS based emulsifier system was used. This means that the PGMS based emulsifier system can be used as an alternative to low temperature extrusion when small ice crystal size in the fresh ice cream is required. The PGMS based emulsifier system even controls the growth of the ice crystals during storage, which is not a feature that is achieved by using low temperature extrusion alone.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims

The invention claimed is:

1. A process for the production of a frozen food product comprising the steps of:
   i) contacting a food intermediate with an emulsifier system, and
   ii) subjecting the food intermediate to freezing conditions whilst agitating the food intermediate,
   wherein the emulsifier system consists essentially of:
   a) compounds of formula I:

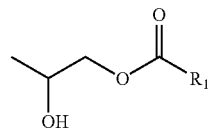

Formula I wherein $R_1$ is a hydrocarbon group and unsaturated lactylated mono-diglycerides; or b) compounds of formula I wherein $R_1$ is a hydrocarbon group and saturated mono-diglycerides; or c) compounds of formula I wherein $R_1$ is a hydrocarbon group and saturated mono-diglycerides and unsaturated lactylated mono-diglycerides.

2. A process for the production of a frozen food product comprising the steps of:
   i) contacting a food intermediate with an emulsifier system; and
   ii) subjecting the food intermediate to freezing conditions whilst agitating the food intermediate;
wherein the emulsifier system consists essentially of:
   a) compounds of formula I:

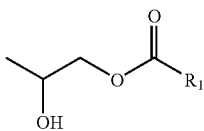

Formula I wherein $R_1$ is a hydrocarbon group and unsaturated lactylated mono-diglycerides; or b) compounds of formula I wherein $R_1$ is a hydrocarbon group and mono-diglycerides; or c) compounds of formula I wherein $R_1$ is a hydrocarbon group and mono-diglycerides and unsaturated lactylated mono-diglycerides, wherein the compound of formula 1 is propylene glycol monostearate.

3. A process according to claim 2 wherein the mono-diglycerides are saturated mono-diglycerides.

4. A process according claim 1 wherein $R_1$ is a $C_7$-$C_{29}$ hydrocarbon group.

5. A process according to claim 1 wherein $R_1$ is a $C_{11}$-$C_{29}$ hydrocarbon group.

6. A process according to claim 1 wherein $R_1$ is a saturated hydrocarbon group.

7. A process according to claim 1 wherein $R_1$ is a $(CH_2)_n CH_3$ group, wherein n is an integer.

8. A process according to claim 7 wherein n is an integer from 16 to 22.

9. A process according to claim 8 wherein n is 20.

10. A process according to claim 8 wherein n is 16.

11. A process according to claim 1 or 2 wherein the mono-diglycerides and the unsaturated lactylated mono-diglycerides are present.

12. A process according to claim 1 or 2 wherein the emulsifier system comprises no sorbitan tristearate.

13. A process according to claim 1 or 2 wherein the emulsifier system comprises no acetylated monoglycerides.

14. A process according to claim 1 or 2 wherein the compounds of formula I are present in an amount of at least 0.2% by weight of the food intermediate.

15. A process according to claim 1 or 2 wherein the compounds of formula I are present in an amount of 0.2% to 1.0% by weight of the food intermediate.

16. A process according to claim 1 or 2 wherein the compounds of formula I are present in an amount of about 0.3% by weight of the food intermediate.

17. A process according to claim 1 or 2 wherein the compounds of formula I are present in an amount of about 0.45% by weight of the food intermediate.

18. A process according to claim 1 or 2 wherein the mono-diglycerides and unsaturated lactylated mono-diglycerides are present in an amount of 0.05% to 1.0% by weight of the food intermediate.

19. A process according to claim 1 or 2 wherein the mono-diglycerides and unsaturated lactylated mono-diglycerides are present in an amount of 0.1 to 0.6% by weight of the food intermediate.

20. A process according to claim 1 or 2 wherein the compounds of formula I and the mono-diglycerides and unsaturated lactylated mono-diglycerides are present in a ratio of 2:1 to 1:2.

21. A process according to claim 1 or 2 wherein the compounds of formula I are present in an amount of about 0.3% by weight of the food intermediate and the mono-diglycerides and unsaturated lactylated mono-diglycerides are present in an amount of about 0.15% by weight of the food intermediate.

22. A process according to claim 1 or 2 wherein the food intermediate comprises fat.

23. A process according to claim 22 wherein the fat comprises a high lauric fat or milkfat.

24. A process according to claim 23 wherein the fat comprises a high lauric fat selected from the group consisting of hardened palm kernel oil and hardened coconut oil.

25. A process according to claim 1 or 2 comprising the step of dissolving the emulsifier system in water.

26. A process according to claim 1 or 2 comprising the step of dissolving the emulsifier system in fat.

27. A process according to claim 1 or 2 wherein the drawing temperature is about −4° C. to −7° C.

28. A process according to claim 1 or 2 wherein the frozen food product is an aerated frozen food product.

29. A process according to claim 1 wherein the emulsifier system consists essentially of compounds of formula I:

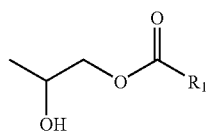

Formula I wherein $R_1$ is a hydrocarbon group; and saturated mono-diglycerides.

30. A process according to claim 29 wherein $R_1$ is independently selected from a $(CH_2)_n CH_3$ group, wherein n is an integer from 6 to 28.

31. A process according to claim 30 wherein n independently selected from integers from 16 to 22.

32. A process according to claim 30 wherein n is independently selected from 14 and 16.

33. A method of inhibiting ice-crystal growth in a frozen food product, comprising preparing a frozen food product including an emulsifier system consists essentially of:
   a) compounds of formula I:

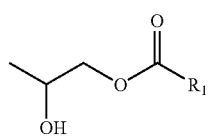

Formula I wherein $R_1$ is a hydrocarbon group;

b) compounds of formula I wherein $R_1$ is a hydrocarbon group and unsaturated lactylated mono-diglycerides; or c) compounds of formula I wherein $R_1$ is a hydrocarbon group and mono-diglycerides; or
d) compounds of formula I wherein $R_1$ is a hydrocarbon group and mono-diglycerides and unsaturated lactylated mono-diglycerides.

34. Use according to claim 33 wherein $R_1$ is independently selected from a $(CH_2)_n CH_3$ group, wherein n is an integer from 6 to 28.

* * * * *